(12) United States Patent
Oami

(10) Patent No.: US 10,748,010 B2
(45) Date of Patent: *Aug. 18, 2020

(54) SURVEILLANCE INFORMATION GENERATION APPARATUS, IMAGING DIRECTION ESTIMATION APPARATUS, SURVEILLANCE INFORMATION GENERATION METHOD, IMAGING DIRECTION ESTIMATION METHOD, AND PROGRAM

(71) Applicant: NEC CORPORATION, Tokyo (JP)

(72) Inventor: Ryoma Oami, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/754,613

(22) PCT Filed: May 9, 2016

(86) PCT No.: PCT/JP2016/063720
§ 371 (c)(1),
(2) Date: Feb. 23, 2018

(87) PCT Pub. No.: WO2017/038160
PCT Pub. Date: Mar. 9, 2017

(65) Prior Publication Data
US 2018/0247135 A1 Aug. 30, 2018

(30) Foreign Application Priority Data

Sep. 1, 2015 (JP) .................................. 2015-172082

(51) Int. Cl.
*G06K 9/00* (2006.01)
*G06T 7/292* (2017.01)
(Continued)

(52) U.S. Cl.
CPC .......... *G06K 9/00778* (2013.01); *G06T 7/248* (2017.01); *G06T 7/292* (2017.01);
(Continued)

(58) Field of Classification Search
None
See application file for complete search history.

(56) References Cited

FOREIGN PATENT DOCUMENTS

| JP | 2002-084531 A | * | 3/2002 |
| JP | 2004-23373 A | | 1/2004 |

(Continued)

OTHER PUBLICATIONS

International Search Report for PCT/JP2016/063720 dated Jul. 12, 2016 [PCT/ISA/210].

(Continued)

*Primary Examiner* — Delomia L Gilliard
(74) *Attorney, Agent, or Firm* — Sughrue Mion, PLLC

(57) ABSTRACT

A surveillance information generation apparatus (2000) includes a first surveillance image acquisition unit (2020), a second surveillance image acquisition unit (2040), and a generation unit (2060). The first surveillance image acquisition unit (2020) acquires a first surveillance image (12) generated by a fixed camera (10). The second surveillance image acquisition unit (2040) acquires a second surveillance image (22) generated by a moving camera (20). The generation unit (2060) generates surveillance information (30) relating to object surveillance, using the first surveillance image (12) and first surveillance information (14).

12 Claims, 35 Drawing Sheets

(51) Int. Cl.
*G06T 7/246* (2017.01)
*G06T 11/60* (2006.01)
*H04N 7/18* (2006.01)
*G06T 11/20* (2006.01)

(52) U.S. Cl.
CPC .............. *G06T 11/60* (2013.01); *H04N 7/181* (2013.01); *G06T 11/206* (2013.01); *G06T 2207/30196* (2013.01); *G06T 2207/30232* (2013.01); *G06T 2207/30244* (2013.01)

(56) References Cited

FOREIGN PATENT DOCUMENTS

| | | | |
|---|---|---|---|
| JP | 2005-175852 A | 6/2005 | |
| JP | 2005-268972 A | * | 9/2005 |
| JP | 2006-331260 A | | 12/2006 |
| JP | 2010-245628 A | | 10/2010 |
| JP | 2011-076316 A | | 4/2011 |
| JP | 2011-176452 A | | 9/2011 |
| JP | 2011176452 A | * | 9/2011 |
| WO | 2014/174737 A1 | | 10/2014 |
| WO | 2019/117736 A1 | | 6/2019 |

OTHER PUBLICATIONS

Communication dated Oct. 23, 2019 from the United States Patent and Trademark Office in U.S. Appl. No. 16/406,705.

Notice of Reasons for Refusal dated Mar. 31, 2020, from the Japanese Patent Office in Application No. 2017-537577.

* cited by examiner

FIG. 22
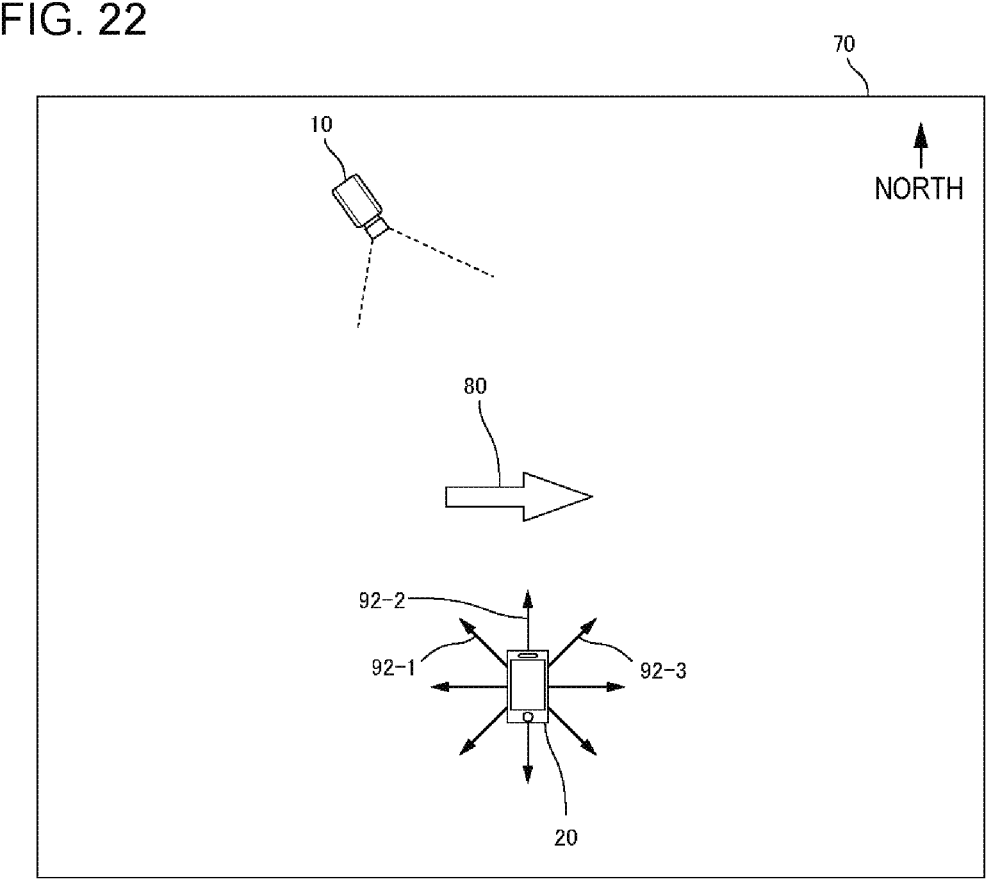
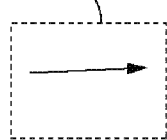
MOVING DIRECTION OF CROWD IN SECOND IMAGED IMAGE
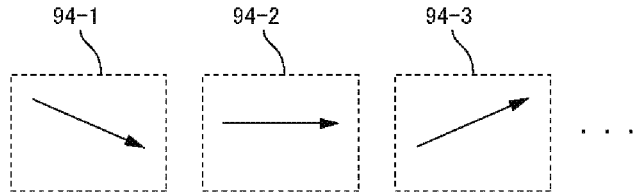
MOVING DIRECTION OF CROWD CORRESPONDING TO CANDIDATE IMAGING DIRECTION

SURVEILLANCE INFORMATION GENERATION APPARATUS, IMAGING DIRECTION ESTIMATION APPARATUS, SURVEILLANCE INFORMATION GENERATION METHOD, IMAGING DIRECTION ESTIMATION METHOD, AND PROGRAM

CROSS REFERENCE TO RELATED APPLICATIONS

This application is a National Stage of International Application No. PCT/JP2016/063720 filed May 9, 2016, claiming priority based on Japanese Patent Application No. 2015-172082 filed Sep. 1, 2015.

TECHNICAL FIELD

The present invention relates to a video surveillance.

BACKGROUND ART

In order to surveil or analyze the state of the crowd, a video imaged by a surveillance camera fixed to a building or the like on the moving route of the crowd is used. For example, Patent Document 1 discloses a technique for analyzing an input surveillance video to calculate the moving direction of the crowd, and controlling a surveillance device according to the calculated moving direction.

RELATED DOCUMENT

Patent Document

[Patent Document 1] Pamphlet of International Publication No. 2014/174737

SUMMARY OF THE INVENTION

Technical Problem

In the video imaged by the surveillance camera fixed to the building or the like as described above, it may be difficult to accurately surveil the state of the crowd. For example, the surveillance camera fixed to the building in this way often images the crowd from a distance. In such a case, since the size of the person captured in the imaged video is small, it is difficult to recognize the state of the crowd (for example, the number of people in the crowd and its distribution).

The present invention has been made in view of the above problem. An object of the present invention is to provide a technique of recognizing the state of a crowd from an imaged video of a crowd.

Solution to Problem

A surveillance information generation apparatus of the present invention includes 1) a first acquisition unit acquiring a first surveillance image imaged by a fixed camera, which is a camera a position of which is fixed; 2) a second acquisition unit acquiring a second surveillance image imaged by a moving camera, which is a camera a position of which is not fixed; and 3) a generation unit generating surveillance information of an object by using the first surveillance image and the second surveillance image.

An imaging direction estimation apparatus of the present invention includes 1) a first moving direction estimation unit estimating a first moving direction which is a moving direction of an object in a first surveillance image imaged by a fixed camera, which is a camera a position of which is fixed; 2) a second moving direction estimation unit estimating a second moving direction which is a moving direction of an object in a second surveillance image imaged by a moving camera, which is a camera a position of which is not fixed; and 3) an imaging direction estimation unit estimating the imaging direction of the moving camera, based on the first moving direction, the second moving direction, the position and pose of the fixed camera, and the position of the moving camera.

A first surveillance information generation method of the present invention is executed by a computer. The method includes 1) a first acquisition step of acquiring a first surveillance image imaged by a fixed camera, which is a camera a position of which is fixed; 2) a second acquisition step of acquiring a second surveillance image imaged by a moving camera, which is a camera a position of which is not fixed; and 3) a generation step of generating surveillance information of an object by using the first surveillance image and the second surveillance image.

An imaging direction estimation method of the present invention is executed by a computer. The method includes 1) a first moving direction estimation step of estimating a first moving direction which is a moving direction of an object in a first surveillance image imaged by a fixed camera, which is a camera a position of which is fixed; 2) a second moving direction estimation step of estimating a second moving direction which is a moving direction of an object in a second surveillance image imaged by a moving camera, which is a camera a position is not fixed; and 3) an imaging direction estimation step of estimating the imaging direction of the moving camera, based on the first moving direction, the second moving direction, the position and pose of the fixed camera, and the position of the moving camera.

Advantageous Effects of Invention

According to the present invention, a technique of recognizing the state of a crowd from an imaged video of the crowd is provided.

BRIEF DESCRIPTION OF THE DRAWINGS

The foregoing and other objects, features and advantages will become more apparent from the following description of preferred exemplary embodiments and the accompanying drawings.

FIG. 22 is a diagram for explaining an operation of an imaging direction estimation unit.

DESCRIPTION OF EMBODIMENTS

Figure 1:
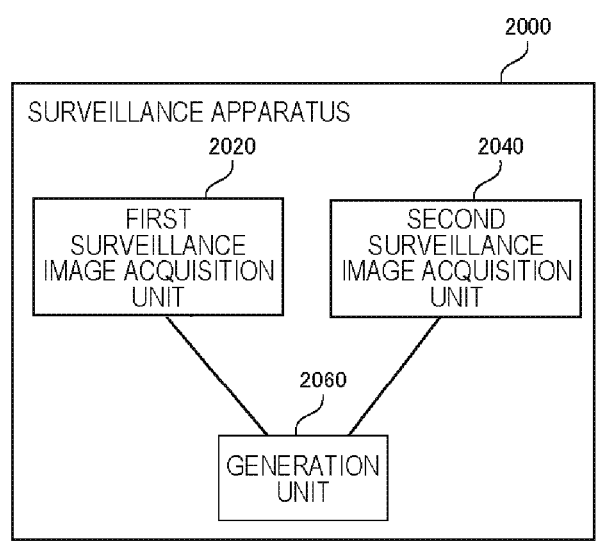
FIG. 1 is a block diagram illustrating a surveillance information generation apparatus according to Example Embodiment 1.

Hereinafter, embodiments of the present invention will be described with reference to the drawings. In all the drawings, the same components are denoted by the same reference numerals, and the description thereof will not appropriately be repeated.

EXAMPLE EMBODIMENT 1

FIG. 1 is a block diagram illustrating a surveillance information generation apparatus 2000 according to Example Embodiment 1. Further, in FIG. 1, each block represents a functional unit configuration, instead of a hardware unit configuration.

The surveillance information generation apparatus 2000 uses two types of surveillance images such as a surveillance image generated by a fixed camera and a surveillance image generated by a moving camera. The fixed camera is a camera the position of which is fixed. For example, the fixed camera is a surveillance camera which is fixedly installed in various places such as walls, pillars, or ceilings. Note that, the place where the fixed camera is installed may be indoors or outdoors. In addition, with respect to the wall or the like on which the fixed camera is provided, it is not limited to real estate as long as the position thereof is fixed for a certain period of time. For example, the wall on which the fixed camera is installed may be partitions, pillars, or the like which are temporarily installed at the event venue or the like.

The moving camera is a camera the position of which is moved. For example, the moving camera is worn on a person, or is attached to a car, a motorcycle, or a flying object, or the like. The moving camera is worn on a person is, for example, a camera held by hand (a camera of a mobile terminal such as a video camera or a smartphone), or a camera fixed to a head or a chest, or the like (such as a body-worn camera). The camera attached to a car, a motorcycle, or a flying object, or the like may be a camera attached for use as a so-called drive recorder, or a camera attached separately for surveillance imaging.

Both the moving camera and the fixed camera capture a place to be surveilled as a video. The place to be surveilled is arbitrary. For example, the place to be surveilled is the route between the event venue and the nearest station. Note that, the place to be surveilled may be indoors or outdoors. The imaging range of the moving camera and the imaging range of the fixed camera may or may not overlap each other.

Figure 2:
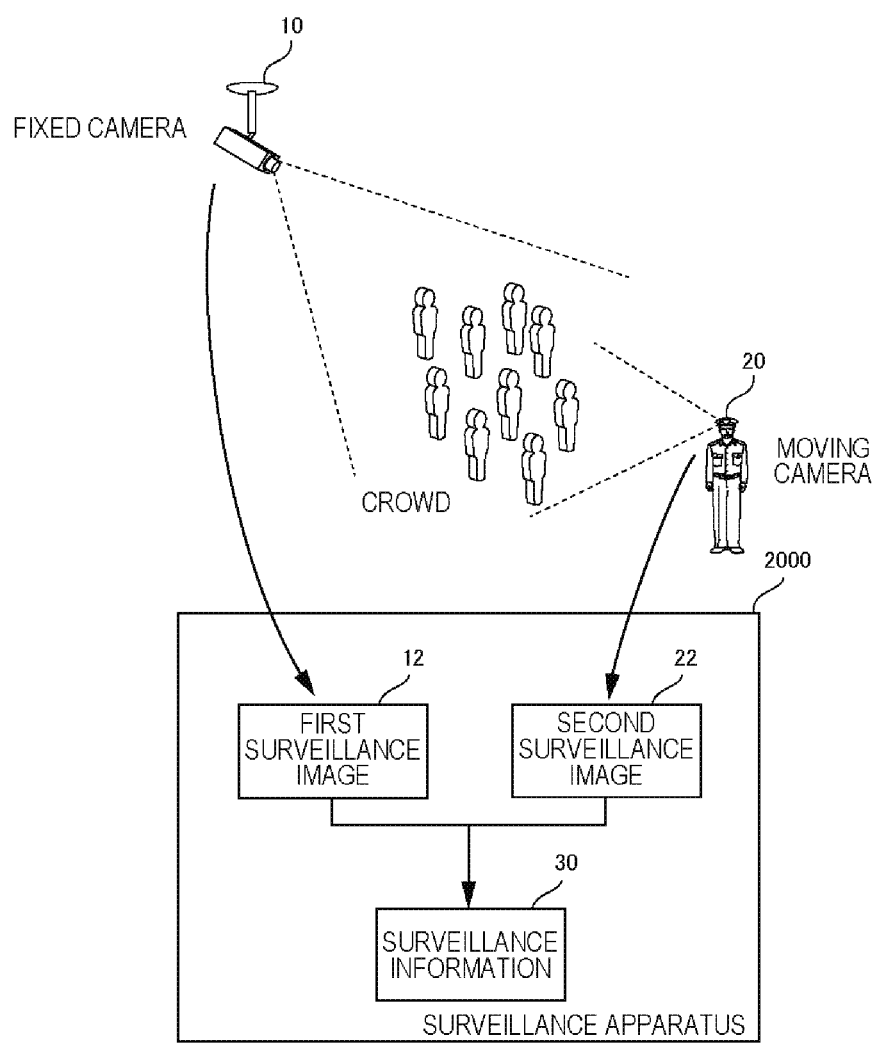
FIG. 2 is a diagram conceptually illustrating an operation of the surveillance information generation apparatus of Example Embodiment 1.

FIG. 2 is a diagram conceptually illustrating an operation of the surveillance information generation apparatus 2000. The fixed camera 10 images the crowd and generates a first surveillance image 12. The crowd here means one or more objects. The object may be a person or a thing other than a person (for example, a car, a motorbike, an animal, or the like). The moving camera 20 images the crowd and generates a second surveillance image 22. Note that, the crowd imaged by the fixed camera 10 and the crowd imaged by the moving camera 20 may be the same or different.

The surveillance information generation apparatus 2000 generates surveillance information 30 using the first surveillance image 12 and the second surveillance image 22. The surveillance information 30 is information on object surveillance. The details contents of the surveillance information 30 and a generation method thereof will be described later.

In order to implement the above operation, the surveillance information generation apparatus 2000 includes a first surveillance image acquisition unit 2020, a second surveillance image acquisition unit 2040, and a generation unit 2060. The first surveillance image acquisition unit 2020 acquires first surveillance image 12. The second surveillance image acquisition unit 2040 acquires second surveillance image 22. The generation unit 2060 generates surveillance information 30, using the first surveillance image 12 and the first surveillance information 14.

<Advantageous Effect>

According to the present example embodiment, surveillance information of crowd is generated using the surveillance image generated by the moving camera 20 in addition to the surveillance image generated by the fixed camera 10. Thus, compared with the case where only the fixed camera 10 is used to recognize the state of the crowd, it becomes possible to recognize the state of the crowd more accurately.

Hereinafter, the present example embodiment will be described in more detail.

<Flow of Process>

Figure 3:
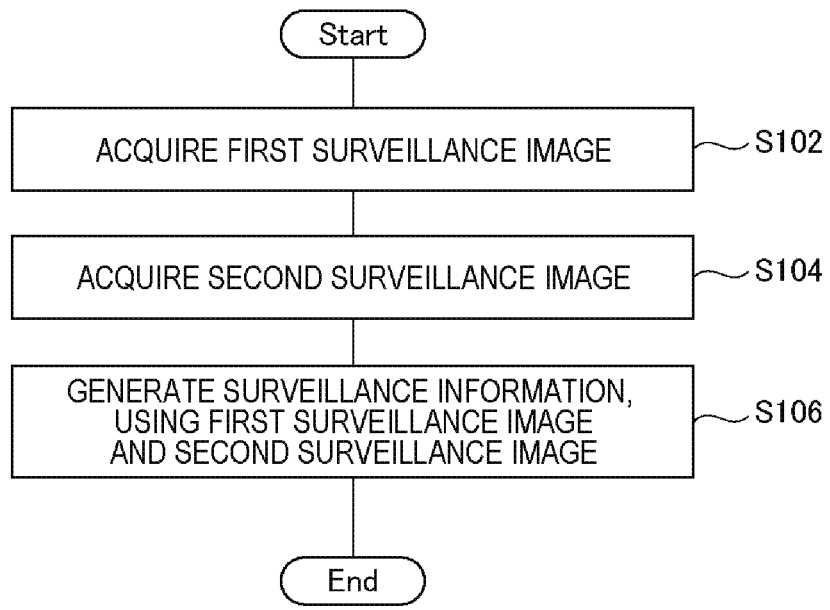
FIG. 3 is a flowchart illustrating a flow of a process executed by the surveillance information generation apparatus of Example Embodiment 1.

FIG. 3 is a flowchart illustrating the flow of a process executed by the surveillance information generation apparatus 2000 of Example Embodiment 1. The first surveillance image acquisition unit 2020 acquires a first surveillance image 12 (S102). The second surveillance image acquisition unit 2040 acquires a second surveillance image 22 (S104). The generation unit 2060 generates surveillance information 30, using the first surveillance image 12 and the second surveillance image 22 (S106).

<Hardware Configuration of Surveillance Information Generation Apparatus 2000>

Figure 4:
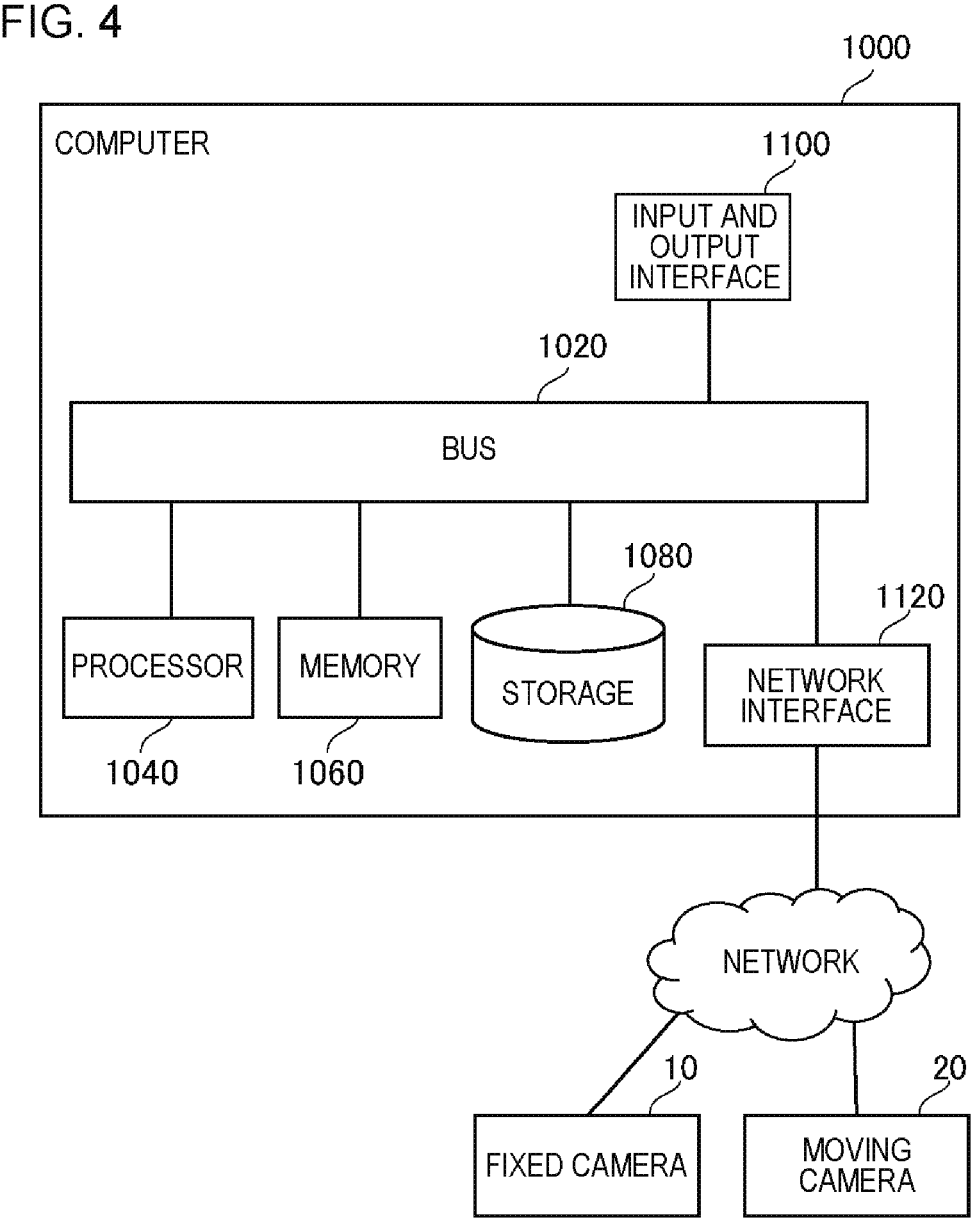
FIG. 4 is a diagram illustrating a hardware configuration of a computer that implements the surveillance information generation apparatus of Example Embodiment 1.

FIG. 4 is a diagram illustrating a hardware configuration of a computer 1000 that implements the surveillance information generation apparatus 2000 of Example Embodiment 1. The computer 1000 may be implemented using a special-purpose apparatus dedicated for implementing the surveillance information generation apparatus 2000, or may be implemented using a general-purpose apparatus such as a personal computer (PC) or a portable terminal.

The computer 1000 includes a bus 1020, processor 1040, a memory 1060, a storage 1080, an input and output interface 1100, and a network interface 1120. The bus 1020 is a data transmission path through which the processor 1040, the memory 1060, the storage 1080, the input and output interface 1100, and the network interface 1120 mutually transmit and receive data. However, a method of connecting the processors 1040 and the like to each other is not limited to bus connection. The processor 1040 is a processor such as a central processing unit (CPU) or a graphics processing unit (GPU). The memory 1060 is a memory such as a random access memory (RAM) or a read only memory (ROM). The storage 1080 is a storage apparatus such as a hard disk, a solid state drive (SSD), or a memory card. Further, the storage 1080 may be a memory such as a RAM or a ROM.

The input and output interface 1100 is an interface for connecting the computer 1000 and an input/output device. For example, a keyboard, a mouse, or the like is connected to the input and output interface 1100.

The network interface 1120 is an interface for communicably connecting the computer 1000 to an external apparatus. The network interface 1120 may be a network interface for connection with a wired line, or a network interface for connection with a wireless line. For example, the computer 1000 that implements the surveillance information generation apparatus 2000 is connected to the fixed camera 10 or the moving camera 20 through a network. However, a method of connecting the computer 1000 to the fixed camera 10 or the moving camera 20 is not limited to the connection through the network. The computer 1000 may not be communicably connected to the fixed camera 10 or the moving camera 20.

The storage 1080 stores a program module for implementing each of the functions of the surveillance information generation apparatus 2000. By executing these respective program modules, the processor 1040 implements each of the functions corresponding to the program modules. Here, when executing each of the above modules, the processor 1040 may execute the modules after reading them on the memory 1060, or may execute the modules without reading them on the memory 1060.

The hardware configuration of the computer 1000 is not limited to the configuration illustrated in FIG. 4. For example, each program module may be stored in the memory 1060. In this case, the computer 1000 may not include the storage 1080.

<Details of First Surveillance Image Acquisition Unit 2020>

The first surveillance image acquisition unit 2020 acquires a first surveillance image 12 (S102). Here, there are various methods by which the first surveillance image acquisition unit 2020 acquires the first surveillance image 12. For example, the first surveillance image acquisition unit 2020 receives the first surveillance image 12 transmitted from the fixed camera 10. In another example, the first surveillance image acquisition unit 2020 may access the fixed camera 10, and acquire the first surveillance image 12 stored in the fixed camera 10. Note that the fixed camera 10 may store the first surveillance image 12 in a storage apparatus provided outside the fixed camera 10. In this case, the first surveillance image acquisition unit 2020 may acquire the first surveillance image 12 by accessing the storage apparatus.

The first surveillance image acquisition unit 2020 may acquire the first surveillance image 12 in real time, or may acquire the first surveillance image 12 for a while after the generation of the first surveillance image 12. In the latter case, for example, the surveillance information generation apparatus 2000 acquires the first surveillance image 12 and the second surveillance image 22 taken in the past (for example, on the previous day) and generates the surveillance information on the past surveillance image to analyze crowd behaviors and others.

<Details of Second Surveillance Image Acquisition Unit 2040>

The second surveillance image acquisition unit 2040 acquires a second surveillance image 22 (S104). Here, the method by which the second surveillance image acquisition unit 2040 acquires the second surveillance image 22 is the same as the method by which the first surveillance image acquisition unit 2020 acquires the first surveillance image 12.

<Details of Generation Unit 2060>

The generation unit 2060 generates surveillance information 30 of the object, using the first surveillance image 12 and the second surveillance image 22 (S106). As described above, the object is not limited to only people, but may be arbitrary. What the generation unit 2060 handles as an object may be previously set in the generation unit 2060, may be stored in a storage apparatus or the like accessible from the generation unit 2060, or may be set manually when the generation unit 2060 operates.

There are a variety of the surveillance information 30 generated by the generation unit 2060. Below, a specific example of the surveillance information 30 and each generation method thereof will be described.

<<Specific Example 1 of Surveillance Information 30>>

Figure 5:
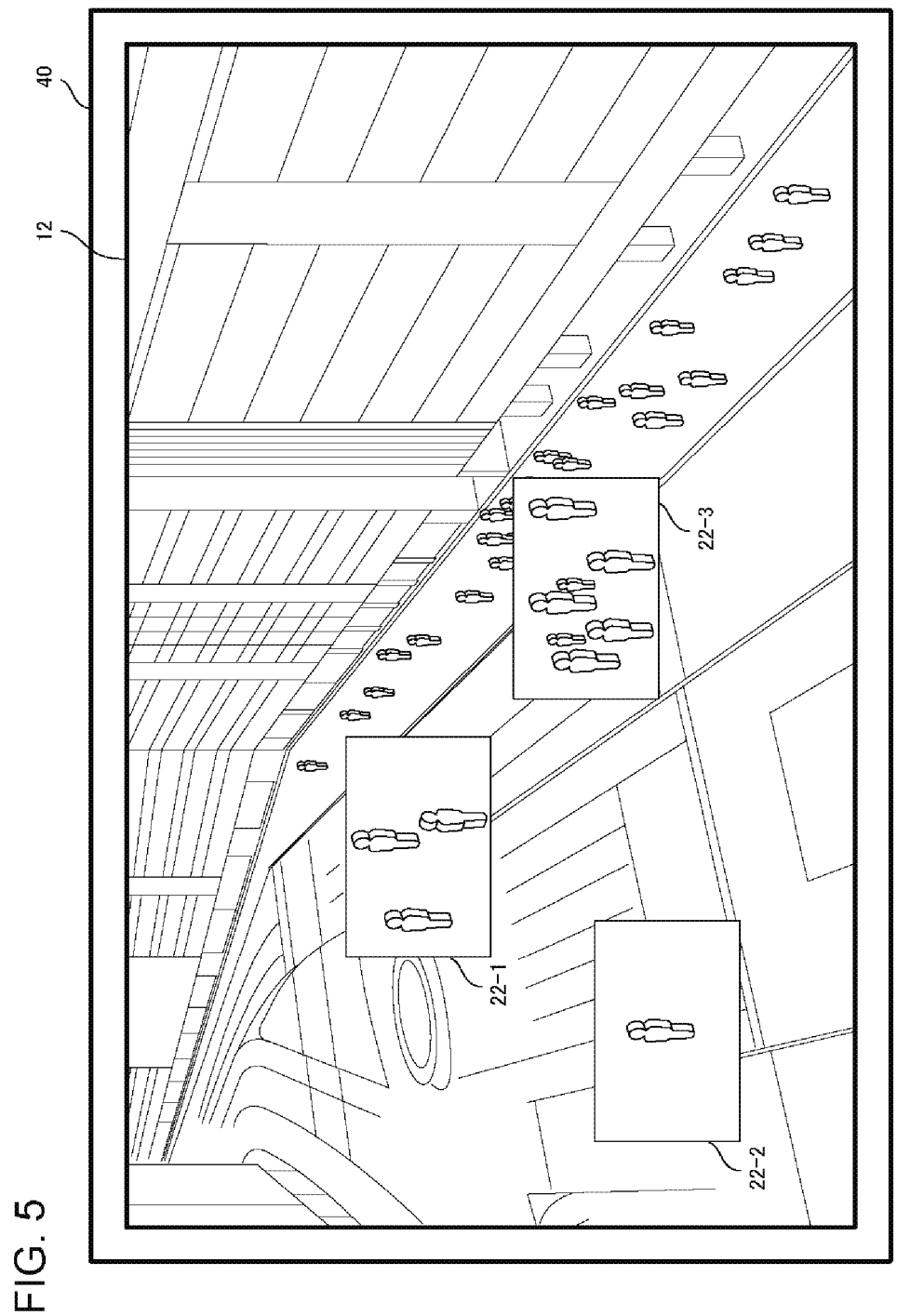
FIG. 5 is a diagram illustrating a display in which a second surveillance image is superimposed on a first surveillance image.

The generation unit 2060 generates a display in which the second surveillance image 22 is superimposed on the first surveillance image 12, as the surveillance information 30. FIG. 5 is a diagram illustrating a display in which the second surveillance image 22 is superimposed on the first surveillance image 12. The display screen 40 of FIG. 5 displays a screen in which a second surveillance image 22-1 to a second surveillance image 22-3 are superimposed on the first surveillance image 12.

The display screen 40 is viewed by, for example, a surveillant in a security room. By viewing the display screen 40, the surveillant can recognize the detailed scene of the individual places taken by the moving camera 20 while recognizing the overall scene of the surveillance place taken by the fixed camera 10. Therefore, the surveillant and others can recognize the state of the crowd flexibly and accurately.

The position of the second surveillance image 22 provided on the first surveillance image 12 is preferably a position or near the position on the first surveillance image 12 corresponding to the position of the second surveillance image 22 on the real world. In this case, the generation unit 2060 determines the position at which the second surveillance image 22 is superimposed, using position information of the moving camera 20, the position information of the fixed camera 10, and the camera parameter representing the pose of the fixed camera 10. Specifically, the generation unit 2060 uses the position information and pose of the fixed camera 10 to determine the position corresponding to the position information of the moving camera 20 from among the places captured in the first surveillance image 12. Here, the pose of the fixed camera 10 includes the horizontal direction and the vertical direction of the imaging direction of the fixed camera 10.

The position information of each camera is arbitrary information that can specify the position of the camera. For example, the position information of the camera is information indicating the global positioning system (GPS) coordinates of the camera.

There are various methods by which the generation unit 2060 acquires the position information of the moving camera 20. The position information of the moving camera 20 is included in, for example, the metadata of the second surveillance image 22. In this case, the generation unit 2060 acquires the position information of the moving camera 20 from the metadata of the second surveillance image 22. For example, the generation unit 2060 may receive position information separately transmitted by the moving camera 20. The transmission may be performed voluntarily by the moving camera 20, or may be performed in response to a request from the generation unit 2060.

The method by which the generation unit 2060 acquires the position information of the fixed camera 10 is the same as for example, the method by which the generation unit 2060 acquires the position information of the moving camera 20. Since the position of the fixed camera 10 is fixed, the position information of the fixed camera 10 may be stored in advance in the storage unit accessible from the generation unit 2060. Further, for example, the position information of the fixed camera 10 may be manually input to the generation unit 2060.

Figure 6:
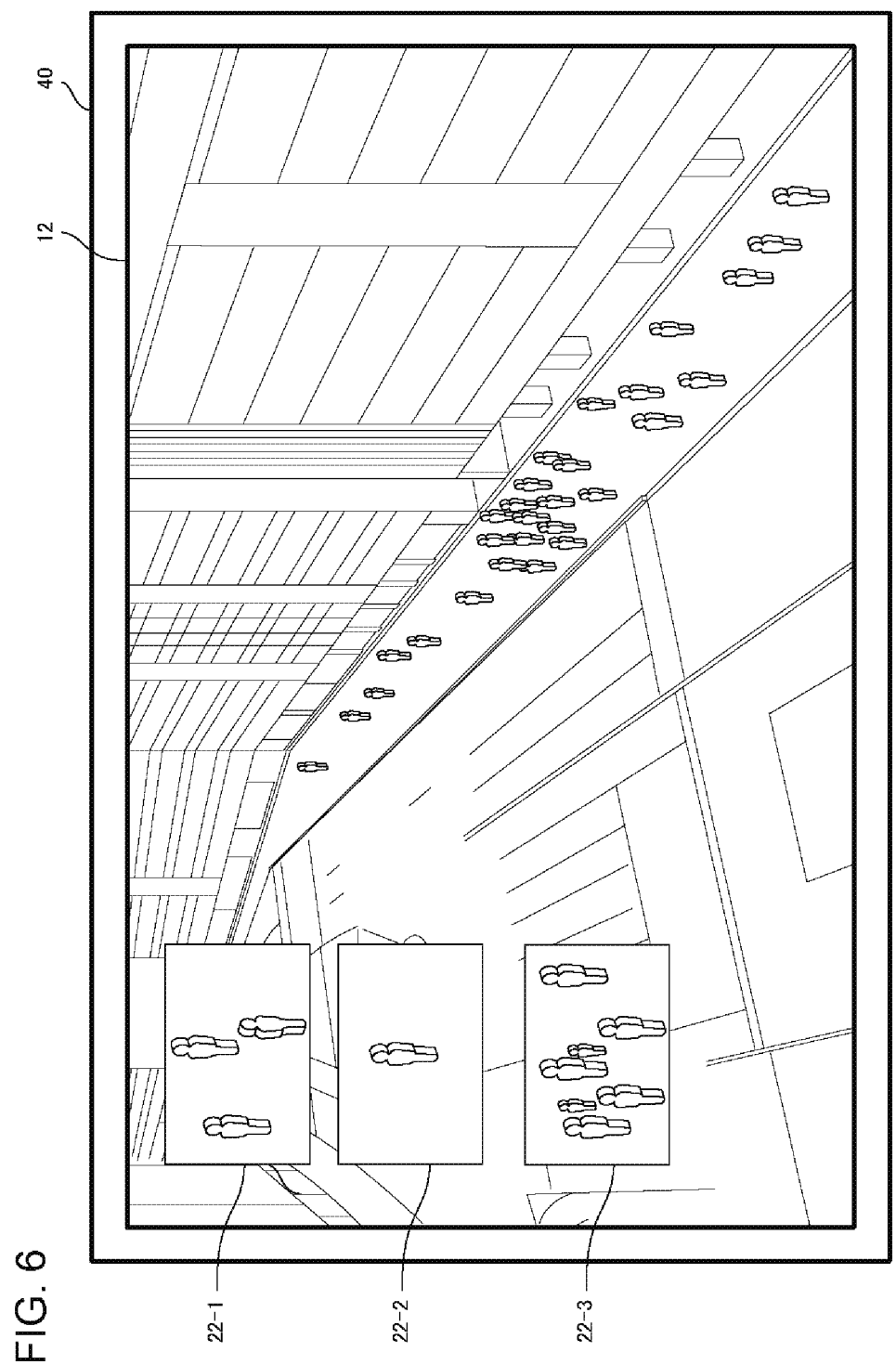
FIG. 6 illustrates a scene in which second surveillance images are displayed side by side in the vicinity of a left end of a display screen.

Note that, the position of the second surveillance image 22 on the first surveillance image 12 is not limited to the position based on the position of the second surveillance image 22 in the real world. For example, the second surveillance image 22 may be displayed at a predetermined position of the first surveillance image 12. FIG. 6 illustrates a scene in which second surveillance images are displayed side by side in the vicinity of a left end of the display screen 40. The predetermined position may be previously set in the generation unit 2060 or may be stored in the storage apparatus accessible from the generation unit 2060.

The display position of the second surveillance image 22 may be changeable by the user's operation. For example, the surveillance information generation apparatus 2000 receives an operation such as dragging the second surveillance image 22 with a mouse and changes the display position of the second surveillance image 22 in response to the operation.

Figure 7:
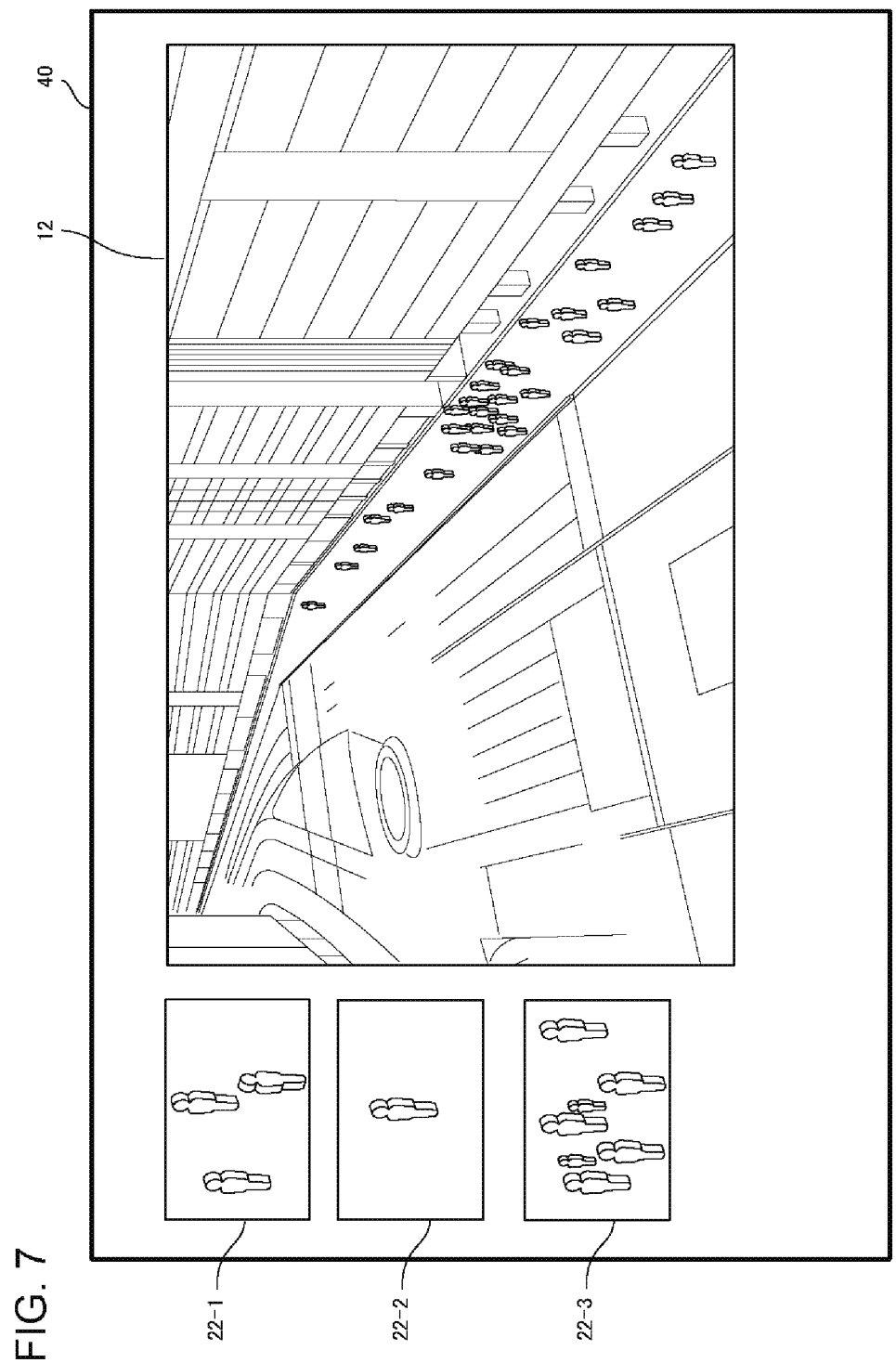
FIG. 7 illustrates a scene in which the first surveillance image and the second surveillance image are displayed side by side on the display screen.

Further, the generation unit 2060 may display the first surveillance image 12 and the second surveillance image 22 side by side instead of superimposing the second surveillance image 22 on the first surveillance image 12. FIG. 7 illustrates a scene in which the first surveillance image 12 and the second surveillance image 22 are displayed side by side on the display screen 40.

In the case where the display position of the second surveillance image 22 on the first surveillance image 12 is not the position based on the position of the moving camera 20 in the real world or the second surveillance image 22 is not superimposed on the first surveillance image 12, it is preferable to know the position of the moving camera 20 which images each second surveillance image 22. In this case, for example, the generation unit 2060 displays a mark representing each moving camera 20, which will be described later, at the position on the first surveillance image 12 corresponding to the position of each moving camera 20 in the real world. Then, the generation unit 2060 displays information (for example, such as the mark number) indicating to which mark each second surveillance image 22 corresponds, for example, next to the second surveillance image 22.

<<Specific Example 2 of Surveillance Information 30>>

The generation unit 2060 generates a display in which a mark indicating the moving camera 20 is superimposed on the first surveillance image 12. Furthermore, in a case where the mark is selected by the user (such as a surveillant), the generation unit 2060 displays the second surveillance image 22 generated by the moving camera 20 corresponding to the mark. As a result, surveillance information 30, which is a display in which the second surveillance image 22 is superimposed on the first surveillance image 12, is generated as in the case of the aforementioned specific example 1.

In this manner, since the second surveillance image 22 is displayed in response to selection by a surveillant or the like, as compared with the case where all the second surveillance images 22 are unconditionally displayed, it becomes easy to recognize the detailed scene of the crowd at the place where the surveillant or others wants to watch, while making it easy to recognize the overall scene of the crowd captured in the first surveillance image 12.

Figure 8:
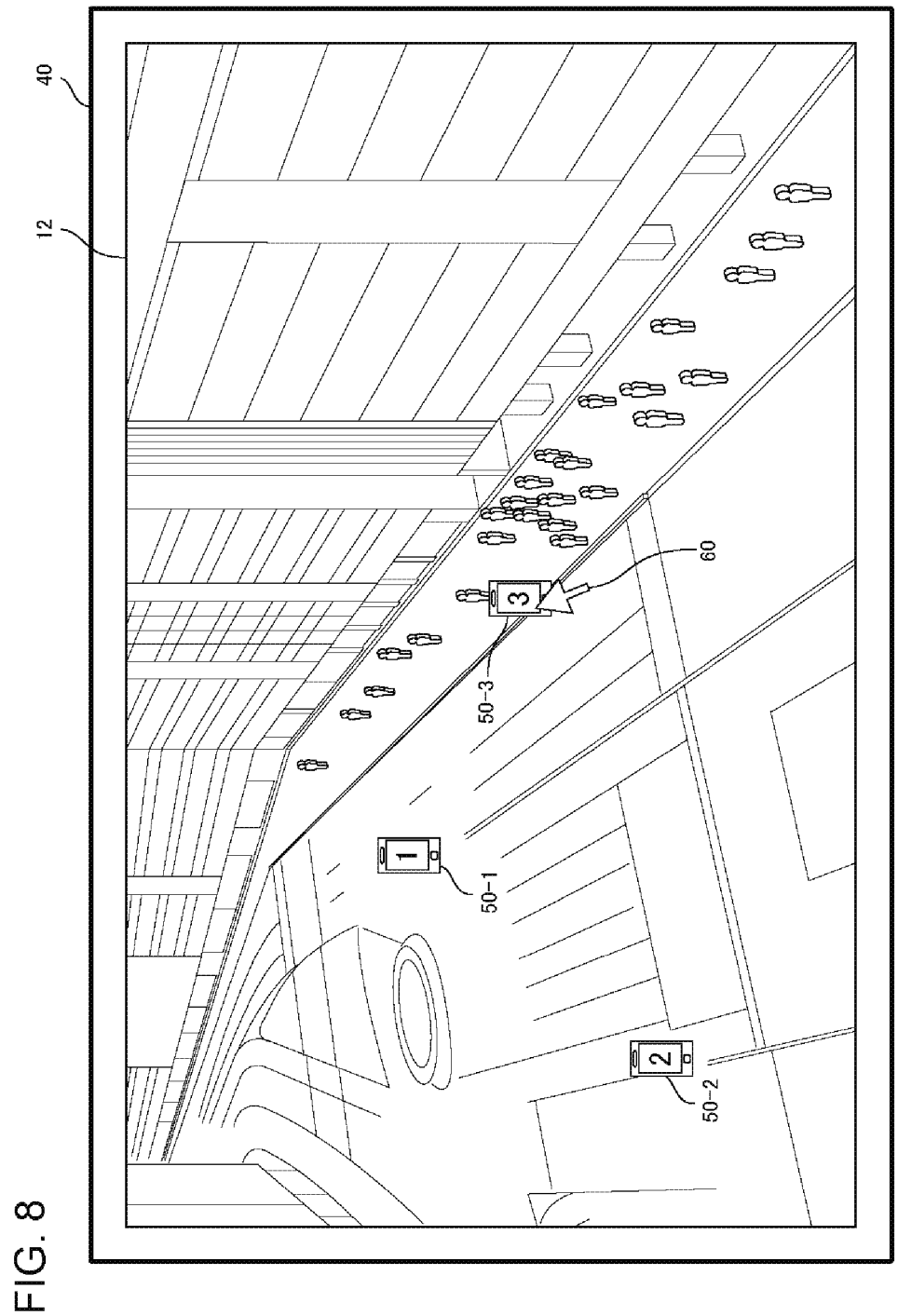
FIG. 8 is a diagram illustrating a scene in which a mark indicating a moving camera is displayed on the first surveillance image.

FIG. 8 is a diagram illustrating a scene in which a mark indicating the moving camera 20 is displayed on the first surveillance image 12. In FIG. 8, there are three moving cameras 20-1 to 3 within the imaging range of the fixed camera 10, and their positions are represented by marks 50-1 to 3, respectively. The position of each mark 50 in FIG. 8 is a position corresponding to the position of the corresponding moving camera 20 in the real world.

Figure 9:
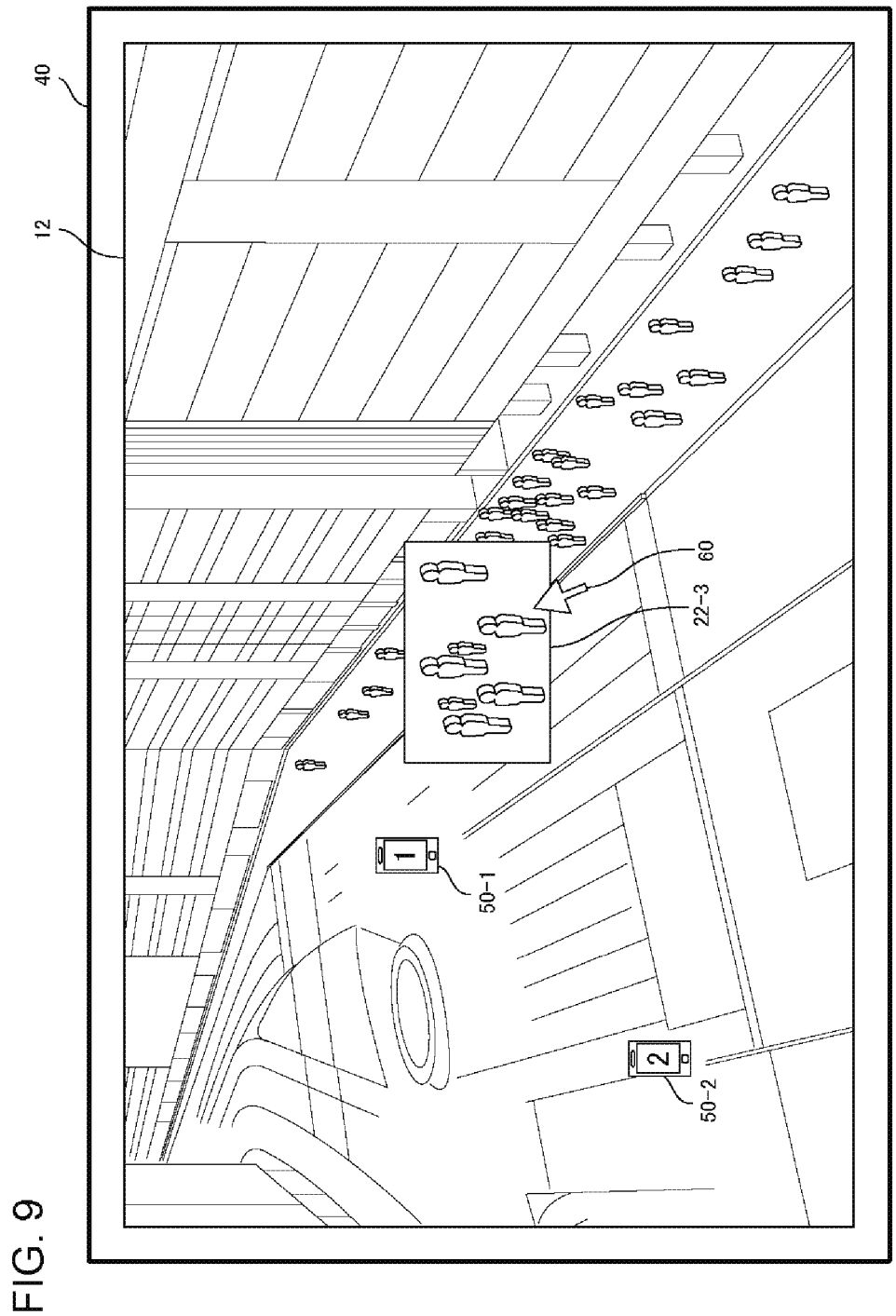
FIG. 9 is a diagram illustrating a display in a case where a mouse cursor is clicked in FIG. 8.

For example, the user selects the mark 50 using the mouse. In FIG. 8, the mouse cursor 60 is located on the mark 50-3. When the user clicks the mouse cursor 60 in this state, the generation unit 2060 displays the second surveillance image 22-3 generated by the moving camera 20-3 on the display screen 40. FIG. 9 is a diagram illustrating a display in a case where the mouse cursor 60 is clicked in FIG. 8.

The user's selection operation on the mark 50 is not limited to the mouse operation. For example, there is an operation to select the mark 50 using a touch panel or a keyboard as another operation.

The display position of the mark of the moving camera 20 displayed on the first surveillance image 12 is not limited to the position corresponding to the position of the moving camera 20 in the real world. This point is the same as the display position of the second surveillance image 22 on the first surveillance image 12 described above.

Figure 10:
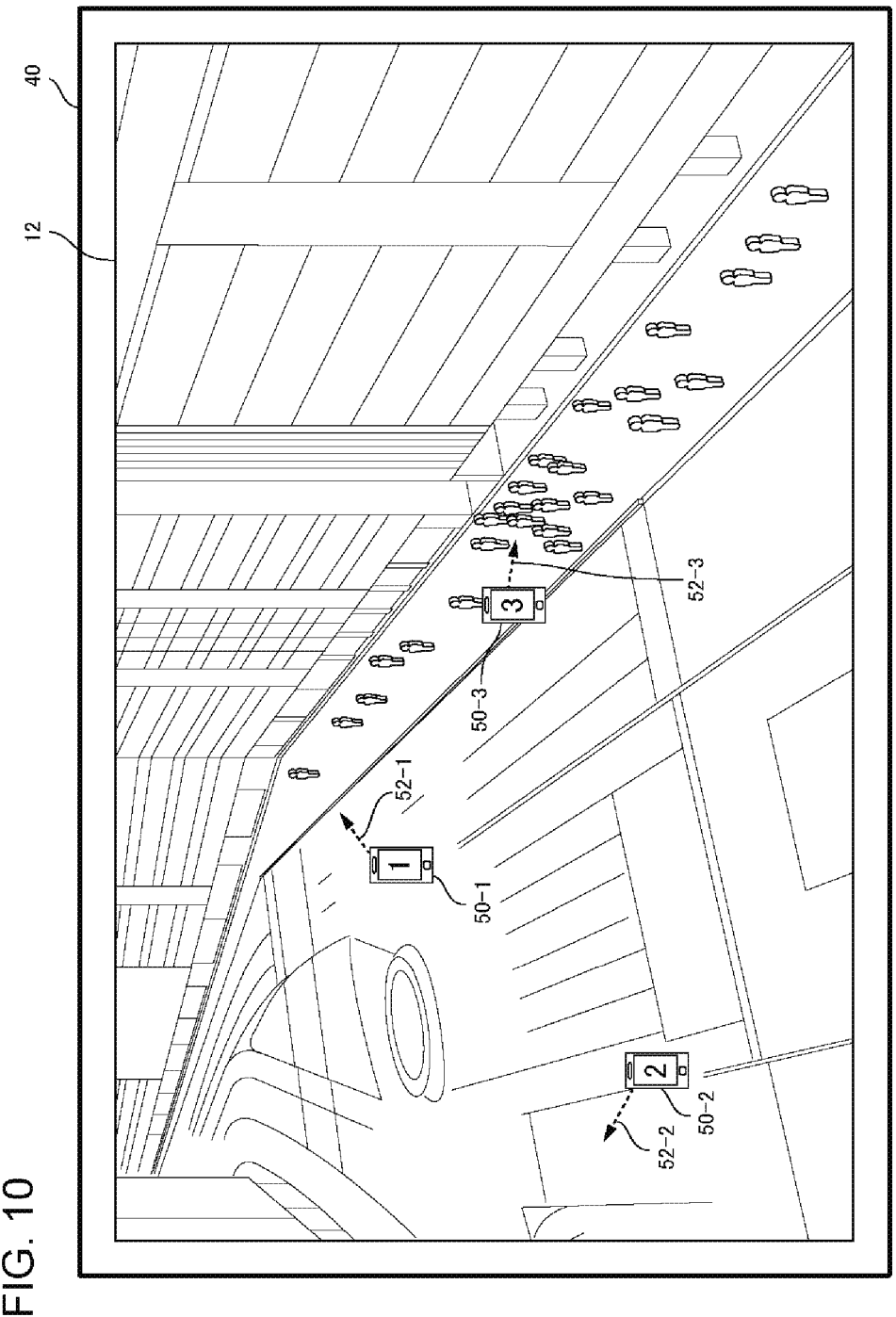
FIG. 10 is a diagram illustrating a scene in which an imaging direction of the moving camera is displayed.

It is preferable that the imaging direction of each moving camera 20 is further displayed on the display screen 40. By doing so, the surveillant or the like who sees the display screen 40 can more accurately and easily recognize the place of the scenery represented by the second surveillance image 22. FIG. 10 is a diagram illustrating a scene in which an imaging direction of the moving camera 20 is displayed. In FIG. 10, the direction indicated by the imaging direction 52 is the imaging direction of the moving camera 20 corresponding to the mark 50.

Here, there are various ways in which the generation unit 2060 recognizes the imaging direction of each moving camera 20. In a case where an electronic compass is built in the moving camera 20 or in a mobile terminal integrated with the moving camera 20, the generation unit 2060 sets the direction indicated by the output of the electronic compass as the imaging direction of the moving camera 20. For example, the generation unit 2060 may use the imaging direction of the moving camera 20 estimated by the method described in an example embodiment to be described later.

<<<Specific Example 3 of Surveillance Information 30>>>

The generation unit 2060 generates, as the surveillance information 30, a display in which information on the crowd is superimposed on the first surveillance image 12. The information on the crowd is, for example, information indicating the distribution of objects included in the crowd. In the following, the information indicating the distribution of objects included in the crowd is represented as distribution information.

Figure 11:
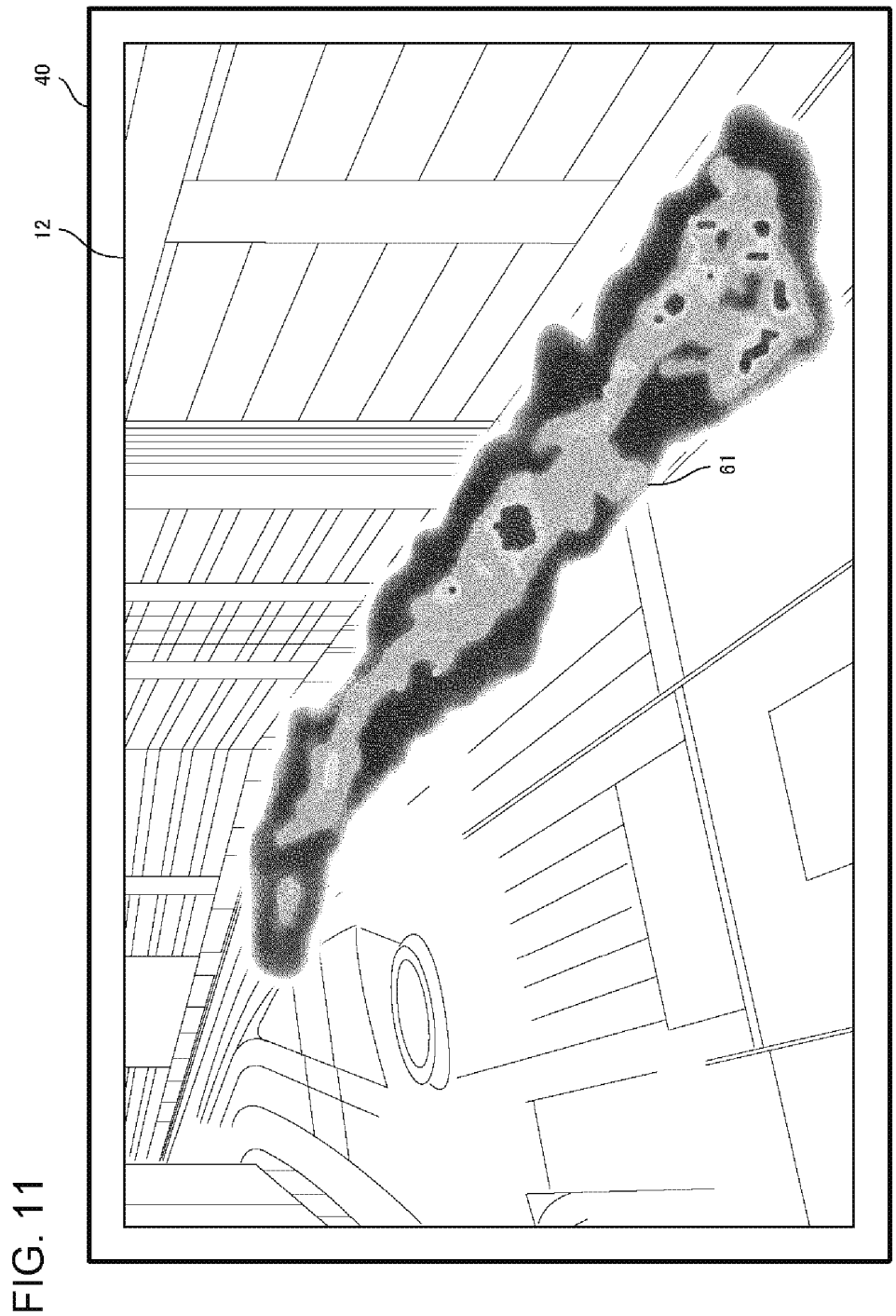
FIG. 11 is a first diagram illustrating superposition of a display based on distribution information on the first surveillance image.
Figure 12:
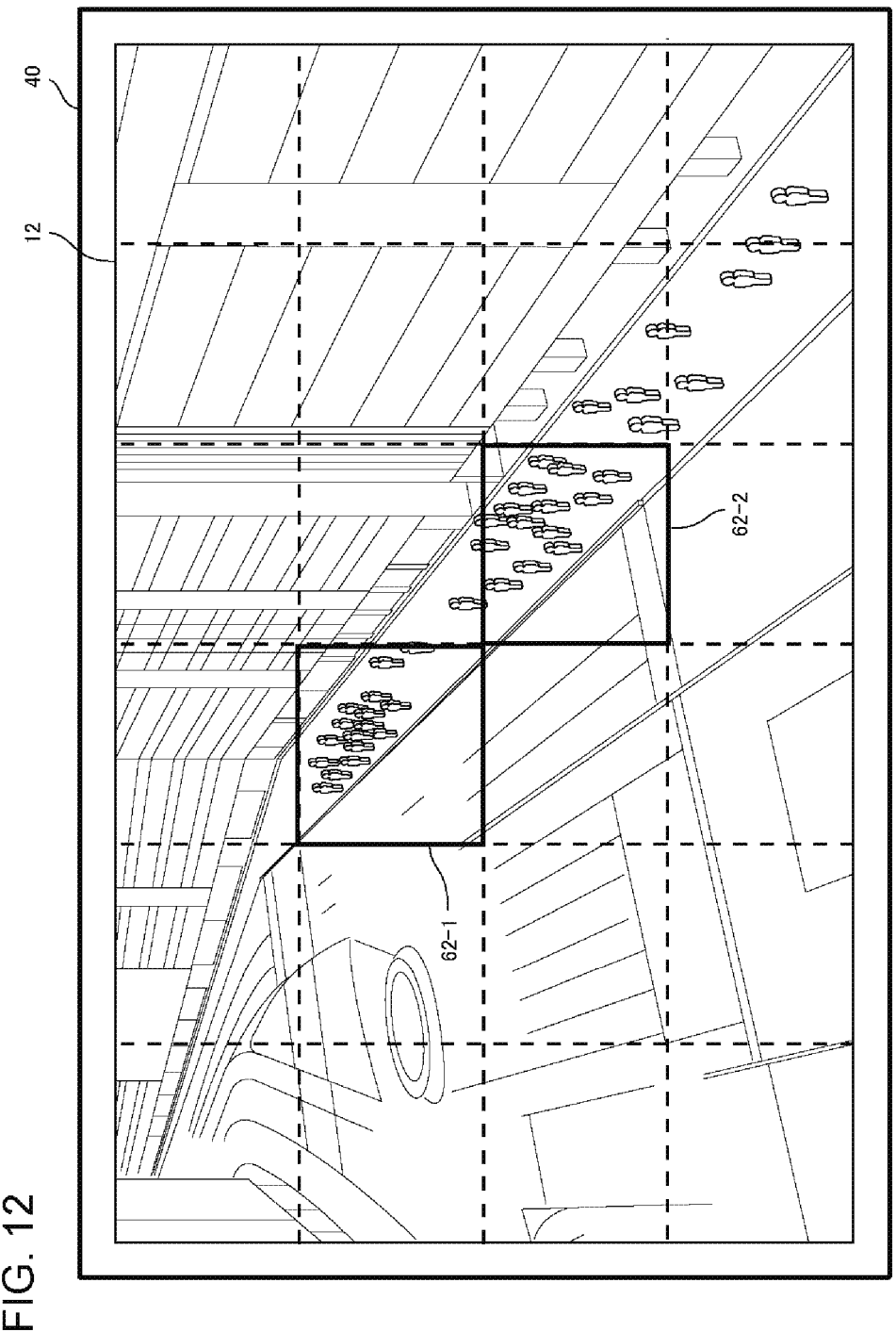
FIG. 12 is a second diagram illustrating superposition of a display based on distribution information on the first surveillance image.

FIG. 11 and FIG. 12 are diagrams illustrating superposition of a display based on the distribution information on the first surveillance image 12. On the display screen 40 of FIG. 11, a heat map 61 representing the distribution of people is superimposed on the first surveillance image 12. For example, the heat map is a heat map in which a place having a high degree of congestion of people is red and a place having a low degree of congestion of people is blue.

On the display screen 40 of FIG. 12, the place where the density of people is high is highlighted with a thick frame line 62. Here, in FIG. 12, the first surveillance image 12 is divided into a plurality of partial regions. Specifically, the first surveillance image 12 is divided into 24 partial regions by dividing the first surveillance image 12 vertically into six equal parts and horizontally into four equal parts. Note that, a dotted line representing each partial region is displayed in FIG. 12 to facilitate understanding of the drawing, but actually the dotted line may not be displayed.

The generation unit 2060 generates, as the surveillance information 30, a display in which the frame line 62 emphasizing an area having a high degree of congestion of people is superimposed on the first surveillance image 12. Specifically, the generation unit 2060 generates distribution information indicating the number of people captured in each partial region, and sets the partial region in which the number is equal to or larger than a predetermined value as a region having a high degree of congestion of people.

By superimposing on the first surveillance image 12, the distribution information of the crowd generated by using the first surveillance image 12 and the second surveillance image 22 in this manner, the surveillant or the like is able to easily recognize the state of the crowd that is difficult to recognize, only by seeing the first surveillance image 12 and the second surveillance image 22.

<<<How to Generate Distribution Information>>>

It will be described how distribution information is generated for realizing each of the above-mentioned displays. The generation unit 2060 generates distribution information, using the first surveillance image 12 and the second surveillance image 22. First, the generation unit 2060 generates distribution information on the first surveillance image 12 by performing a process such as an image recognition process on the first surveillance image 12. More specifically, the generation unit 2060 divides the first surveillance image 12 into a plurality of partial regions, and calculates the number of objects captured in each partial region. As a result, distribution information indicating the number of objects for each partial region of the first surveillance image 12 is generated.

Further, the generation unit 2060 determines the area captured in the second surveillance image 22 among the partial regions of the first surveillance image 12. The generation unit 2060 corrects the number of objects indicated for the determined area in the distribution information, by using the number of objects in the second surveillance image 22. Then, the generation unit 2060 displays a superposition of the corrected distribution information on the first surveillance image 12. Note that, the number of objects captured in the second surveillance image 22 can be calculated by performing an image recognition process or the like on the second surveillance image 22 in the same manner as the number of objects captured in the first surveillance image 12.

Figure 13A:
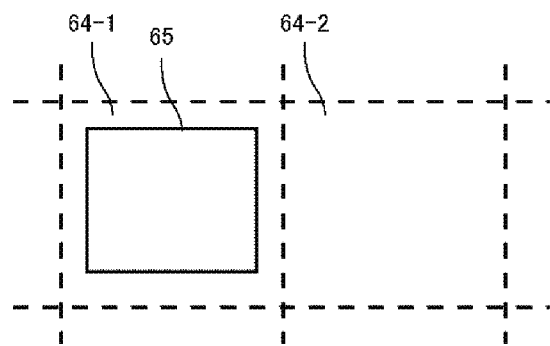
FIGS. 13 A and 13B are diagrams illustrating overlap between a range captured in the first surveillance image and a range captured in the second surveillance image.
Figure 13B:
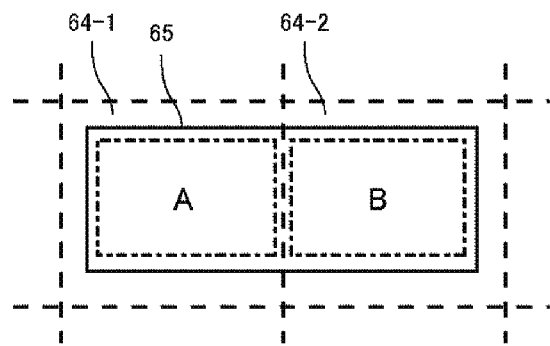

FIGS. 13A and 13B are diagrams illustrating overlap between a range captured in the first surveillance image 12 and a range captured in the second surveillance image 22. In FIGS. 13A and 13B, the partial region 64-1 is the above-mentioned partial region obtained by dividing the first surveillance image 12 into a plurality of parts. In FIG. 13A, the range 65 captured in the second surveillance image 22 is within one partial region 64-1. In this case, the generation unit 2060 calculates the number of objects captured in the entire second surveillance image 22, and corrects the number of objects in the partial region 64-1 indicated by the distribution information by using the calculated number of objects. For example, the generation unit 2060 performs a process such as 1) replacing the number of objects in the partial region 64-1 indicated by the distribution information with the number of objects calculated for the second surveillance image 22, or 2) replacing the number of objects in the partial region 64-1 indicated by the distribution information with the statistical value of that number and the number of objects calculated for the second surveillance image 22. The statistical value in 2) is a weighted average with a weight greater than a weight for the number of objects indicated by the distribution information, with respect to the number of objects calculated for the second surveillance image 22.

In the case of FIG. 13B, the range 65 captured in the second surveillance image 22 straddles the two partial regions 64-1 and 64-2. In this case, the generation unit 2060 divides the second surveillance image 22 into an area A overlapping the partial region 64-1 and an area B overlapping the partial region 64-2, and calculates the number of objects captured in each area. Then, the generation unit 2060 corrects the number of objects in the partial region 64-1 indicated by the distribution information by using the number of objects calculated for the region A. Similarly, the generation unit 2060 corrects the number of objects in the partial region 64-2 indicated by the distribution information by using the number of objects calculated for the region B. Each correction method is the same as the method described using FIG. 13A.

In this way, by correcting the distribution information of the object calculated for the first surveillance image 12 by using the number of objects captured in the second surveillance image 22, the distribution of the object can be calculated more accurately. This is because the number of objects calculated for the second surveillance image 22 can be calculated more accurately than the number of objects calculated for the first surveillance image 12.

For example, as shown in FIG. 11, in a case where the fixed camera 10 images a wide range from a distance far from the moving camera 20, since the captured object is small in the first surveillance image 12, it may be difficult to calculate the number of the captured objects accurately. On the other hand, the object is captured largely and clearly in the second surveillance image 22 generated by the moving camera 20 imaging the object at a distance closer than the fixed camera 10. Therefore, the generation unit 2060 can calculate the number of objects captured in the second surveillance image 22 more accurately than the number of objects captured in the first surveillance image 12.

In addition, for example, as shown in FIG. 11, in a case where the fixed camera 10 performs imaging at such an angle that it looks down obliquely from a distance, people who are close to each other may overlap each other and some people may not be captured in the first surveillance image 12 in some cases. On the other hand, for example, by attaching the moving camera 20 to a compact flying object and performing imaging the crowd from directly above, it is possible to perform imaging such that people in close proximity do not overlap. Therefore, the number of objects calculated using the second surveillance image 22 generated by the moving camera 20 performing imaging in this way is more accurate than the number of objects calculated using the first surveillance image 12.

<<<About Update of Distribution Information>>>

Since the fixed camera 10 and the moving camera 20 are cameras that perform imaging and generate videos, the first surveillance image 12 and the second surveillance image 22 are repeatedly generated. Thus, the surveillance information generation apparatus 2000 may repeatedly generate the above-mentioned distribution information and update the distribution information to be displayed. This makes it possible to display distribution information such as a heat map like an animation. Note that, distribution information may be generated using all the first surveillance images 12 and the second surveillance images 22, or may be generated using some of the first surveillance images 12 and the second surveillance images 22. In the latter case, distribution information is generated at intervals such as once per second or once per 10 seconds. Further, the surveillance information generation apparatus 2000 may receive a user operation instructing the generation of distribution information, and update the distribution information only when receiving the user operation.

<<<Other use Methods of Distribution Information>>>

In the above example, the generation unit 2060 handles the display in which the distribution information is superimposed on the first surveillance image 12 as the surveillance information 30. However, the generation unit 2060 may use the distribution information itself as the surveillance information 30. In this case, for example, the generation unit 2060 stores the distribution information in the storage apparatus or the like, or displays the distribution information on the display screen in a tabular form, a graph form or the like. The distribution information can be used for behavior analysis of the crowd, or the like. Further, the surveillance information generation apparatus 2000 may use distribution information as another specific example described below.

<<Specific Example 4 of Surveillance Information 30>>

Figure 14:
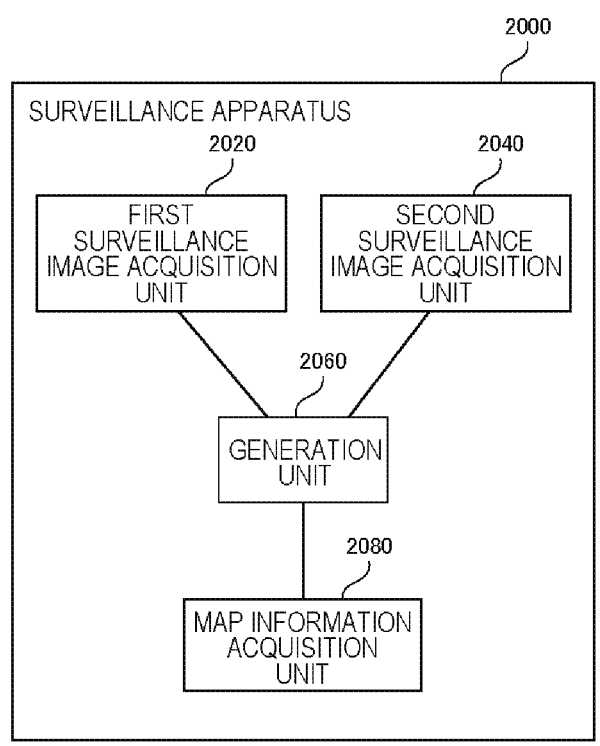
FIG. 14 is a block diagram illustrating a surveillance information generation apparatus including a map information acquisition unit.

The generation unit 2060 may superimpose the aforementioned distribution information on the map of the place to be surveilled and display it. In this case, the surveillance information generation apparatus 2000 includes a map information acquisition unit 2080. The map information acquisition unit 2080 acquires map information, which is information relating to a map around the place to be surveilled. FIG. 14 is a block diagram illustrating the surveillance information generation apparatus 2000 including the map information acquisition unit 2080. For example, the map information indicates the positions of a sidewalk, a road, a building, and the like. For example, it is assumed that the map information is stored in advance in a storage apparatus accessible from the surveillance information generation apparatus 2000 or the like.

Figure 15:
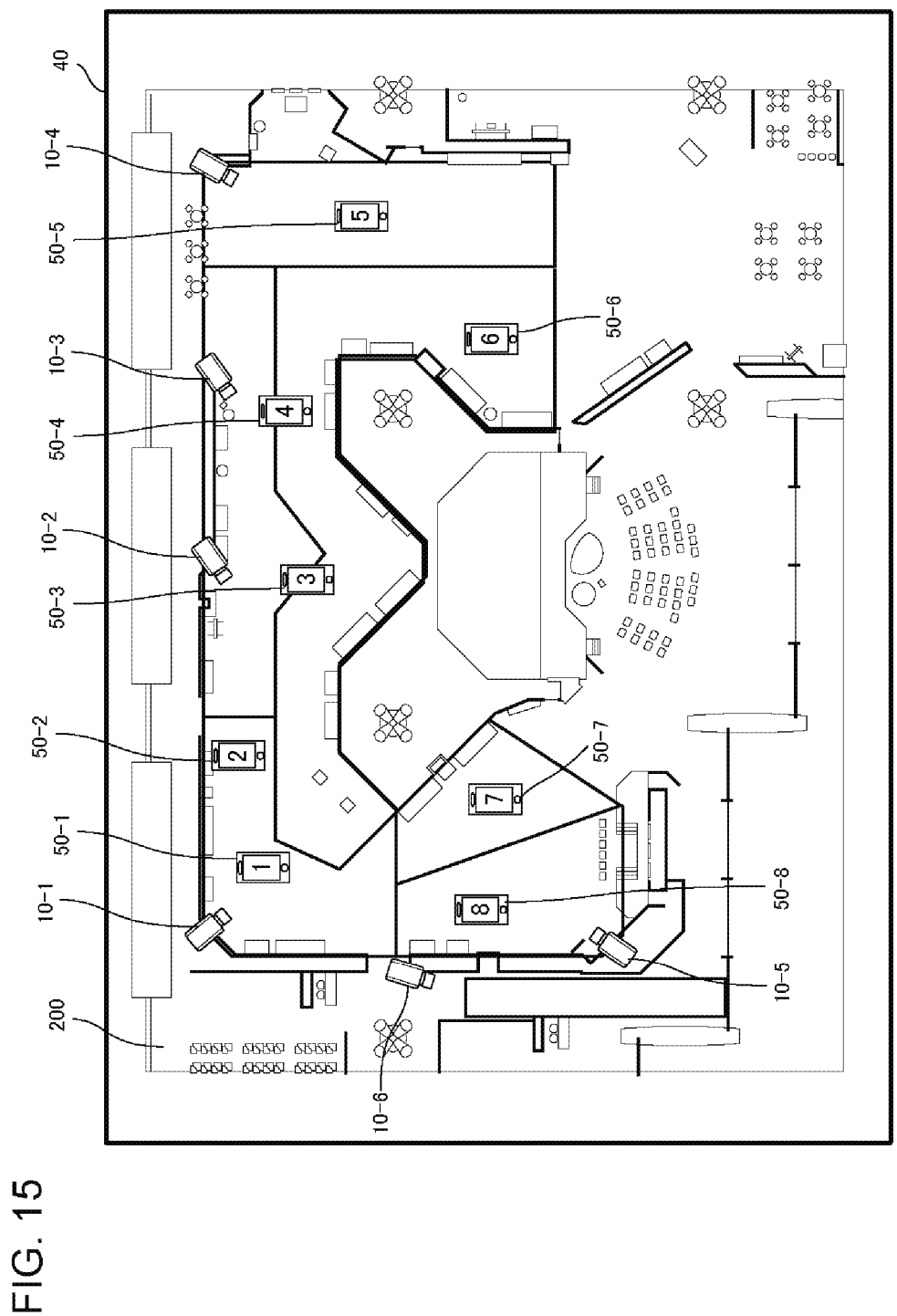
FIG. 15 is a diagram illustrating a map displayed on a display screen.

FIG. 15 is a diagram illustrating a map 200 displayed on the display screen 40. The surveillance target in FIG. 15 is an indoor floor. In FIG. 15, a plurality of fixed cameras 10 are installed. In addition, there are a plurality of moving cameras 20. In FIG. 15, the position of the moving camera 20 is indicated by a mark 50. Note that, the position of the fixed camera 10 and the position of the moving camera 20 on the map 200 can be calculated using the position information of the fixed camera 10, the position information of the moving camera 20, and the position information of the place indicated by the map 200. Further, in a case where the arrangement of the fixed camera 10 is fixed, the position of the fixed camera 10 may be indicated in the map 200 in advance.

First, the generation unit 2060 uses the first surveillance image 12 generated by each fixed camera 10 to generate distribution information of the object in the imaging range of each fixed camera 10. Furthermore, the generation unit 2060 corrects each piece of distribution information by using the number of objects calculated for the second surveillance image 22. Note that, a method of correcting the distribution information using the number of objects calculated for the second surveillance image 22 is the same as the method described using FIGS. 13A and 13B.

Figure 16:
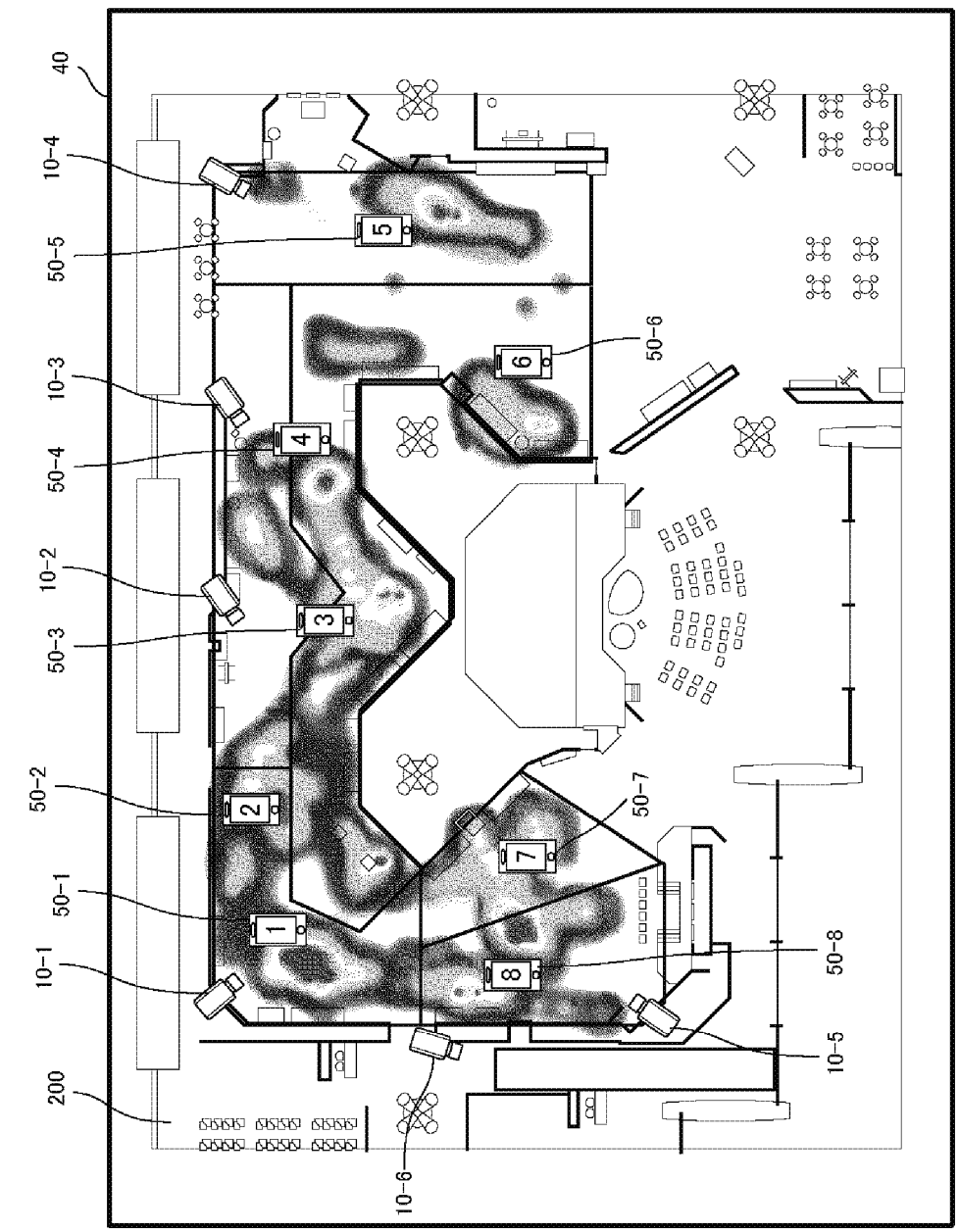
FIG. 16 is a diagram illustrating a map on which a heat map generated based on the corrected distribution information is superimposed.

The generation unit 2060 superimposes a display based on each piece of corrected distribution information on the map 200 and displays it. FIG. 16 is a diagram illustrating the map 200 on which a heat map generated based on the corrected distribution information is superimposed.

If the distribution information is displayed on the map as described above, the background is simplified, and thus it becomes easy for a surveillant or the like to visually recognize the distribution information. If distribution information is displayed on the map, the state of the crowd in a surveillance place can be displayed on one screen by the plurality of fixed cameras 10. Therefore, a surveillant or the like can easily recognize the scene of a crowd who are distributed over a wide range.

Note that, the generation unit 2060 may receive an operation of selecting the mark 50 from the user and display the second surveillance image 22 generated by the moving camera 20 corresponding to the selected mark 50 on the map 200, similar to the process described with reference to FIG. 8 and FIG. 9. Further, the generation unit 2060 may display on the map 200, distribution information (information indicating the distribution of objects in the imaging range of the moving camera 20) generated using the second surveillance image 22, instead of the second surveillance image 22 or together with the second surveillance image 22.

Modification Example

The generation unit 2060 may generate the aforementioned distribution information using only the second surveillance image 22 without using the first surveillance image 12. In this case, for example, the generation unit 2060 calculates the number of objects captured in the second surveillance image 22 generated by each of the plurality of moving cameras 20, and generates distribution information as a list of the combination of "the imaging range of the second surveillance image 22 and the number of objects". Then, the generation unit 2060 generates a heat map or the like using the distribution information, superimposes the generated heat map on the first surveillance image 12 or the map 200, and displays it.

Further, the generation unit 2060 may generate distribution information for each second surveillance image 22 in the same method as the method for generating distribution information for the first surveillance image 12. In this case, the generation unit 2060 generates a heat map or the like using a plurality of pieces of distribution information, superimposes the generated heat map on the first surveillance image 12 or the map 200, and displays it.

Example Embodiment 2

Figure 17:
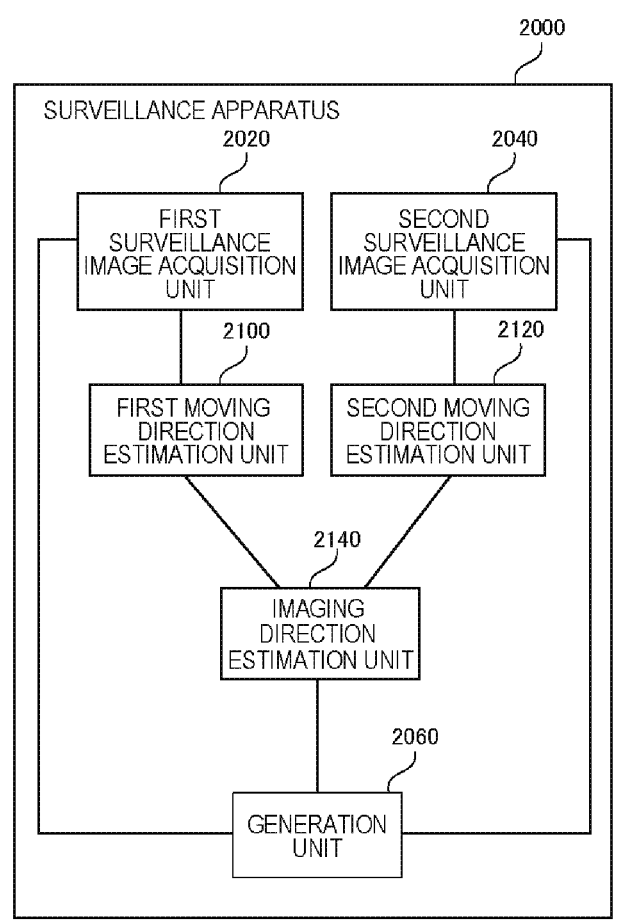
FIG. 17 is a block diagram illustrating a surveillance information generation apparatus according to Example Embodiment 2.

FIG. 17 is a block diagram illustrating a surveillance information generation apparatus 2000 according to Example Embodiment 2. In FIG. 17, each block represents a functional unit configuration, instead of a hardware unit configuration.

The surveillance information generation apparatus 2000 of Example Embodiment 2 has a function of estimating the imaging direction of the moving camera 20. In the case of the fixed camera 10 provided on a wall or the like, generally, the imaging direction of the fixed camera 10 is known by acquiring camera parameters (such as a rotation angle in a horizontal direction and a rotation angle in a vertical direction) representing the current pose of the camera. For example, it is assumed that there is a fixed camera 10 provided facing north in an initial state, and the camera parameter acquired from the fixed camera 10 represents a rotation angle in the horizontal direction of +45 degrees. Here, the rotation angle in the horizontal direction is represented with the counterclockwise direction as the positive direction. This point also applies to the following description. Then, the imaging direction of the fixed camera 10 can be recognized to be northwest, which is a direction rotated counterclockwise by 45 degrees from the north.

On the other hand, in the case of the moving camera 20 worn by a person or the like, unlike the fixed camera 10, it is difficult to determine a reference orientation of the initial state, and thus it is difficult to determine the imaging direction of the moving camera 20.

Here, there is also a method to determine the imaging direction by providing an electronic compass in a camera or the like. However, with this method, if the precision of the electronic compass is poor, it is impossible to determine an accurate imaging direction. Further, if a high-precision electronic compass needs to be attached to the moving camera 20, there is a possibility that the manufacturing cost of the moving camera 20 may increase. Furthermore, if the high-precision electronic compass needs to be attached to the moving camera 20, it becomes difficult to use a general-purpose camera such as a camera of a smartphone or a handy camera as the moving camera 20.

Figure 18:
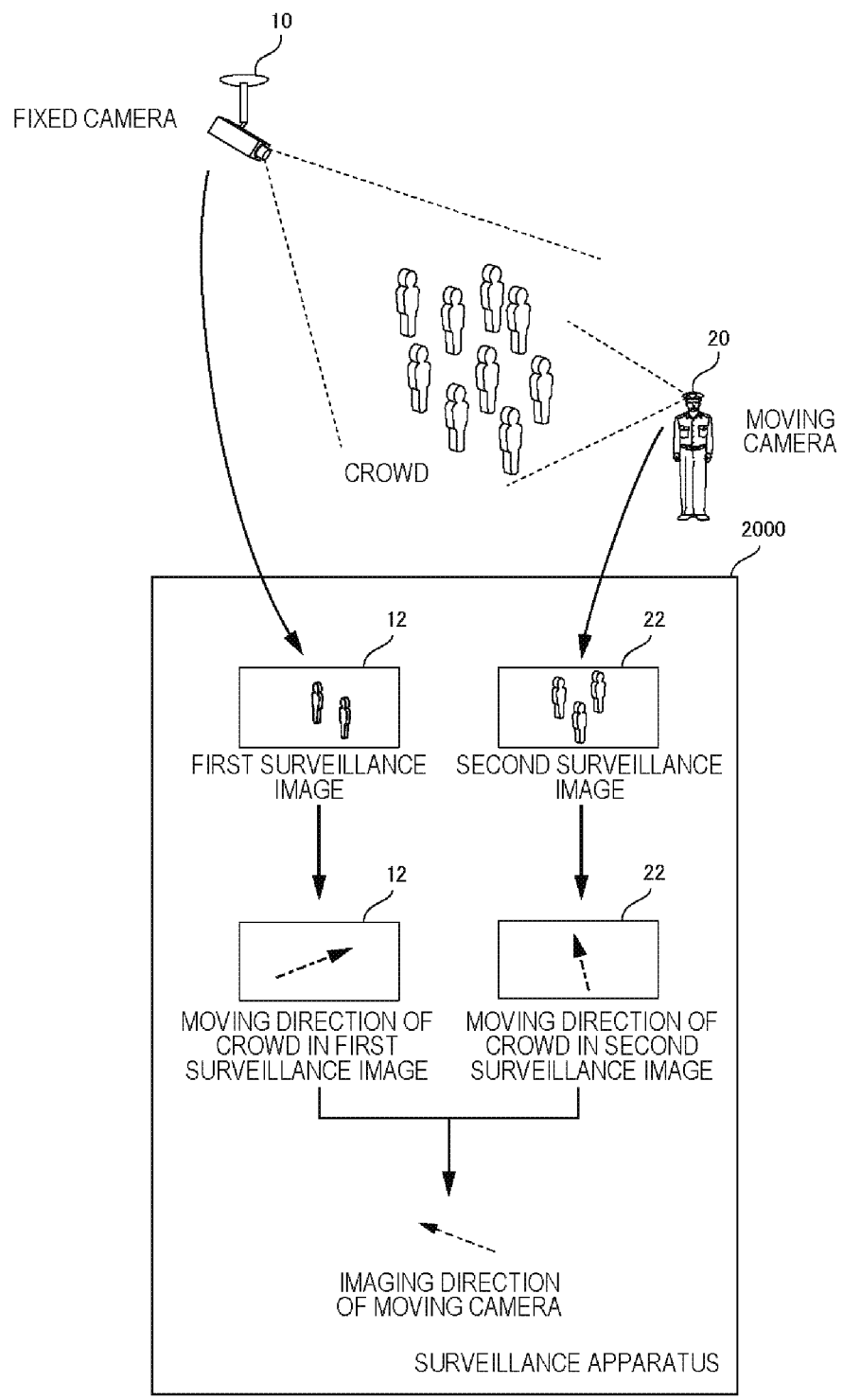
FIG. 18 is a diagram conceptually illustrating an operation of the surveillance information generation apparatus of Example Embodiment 2.

Therefore, the surveillance information generation apparatus 2000 of the present example embodiment estimates the imaging direction of the moving camera 20 using the first surveillance image 12 and the second surveillance image 22. FIG. 18 is a diagram conceptually illustrating an operation of the surveillance information generation apparatus 2000 of Example Embodiment 2. The surveillance information generation apparatus 2000 acquires the first surveillance image 12 generated by the fixed camera 10, and estimates the moving direction (hereinafter, referred to as the first moving direction) of the crowd in the first surveillance image 12. The surveillance information generation apparatus 2000 acquires the second surveillance image 22 generated by the moving camera 20, and estimates the moving direction (hereinafter, referred to as the second moving direction) of the crowd in the second surveillance image 22. Then, the surveillance information generation apparatus 2000 estimates the imaging direction of the moving camera 20, based on the moving direction of the crowd in the first surveillance image 12 and the moving direction of the crowd in the second surveillance image 22.

In order to implement the above operation, the surveillance information generation apparatus 2000 of Example Embodiment 2 further includes a first moving direction estimation unit 2100, a second moving direction estimation unit 2120, and an imaging direction estimation unit 2140. The first moving direction estimation unit 2100 estimates the moving direction of the crowd in the first surveillance image 12. The second moving direction estimation unit 2120 estimates the moving direction of the crowd in the second surveillance image 22. The imaging direction estimation unit 2140 estimates the imaging direction of the moving camera 20, based on the first moving direction, the second moving direction, the position and pose of the fixed camera 10, and the position of the moving camera 20.

<Advantageous Effect>

According to the surveillance information generation apparatus 2000 of the example embodiment, since the moving direction of the moving camera 20 is estimated using the first surveillance image 12 and the second surveillance image 22, it is possible to accurately recognize the imaging direction of the moving camera 20 even in a case where the imaging direction of the moving camera 20 cannot be calculated accurately using a device such as an electronic compass attached to the moving camera 20.

The imaging direction of the moving camera 20 estimated by the surveillance information generation apparatus 2000 can be used for processes such as a process of visualizing the imaging direction of the moving camera 20 described in Example Embodiment 1, and a process of mapping the range captured in the second surveillance image 22 on the first surveillance image 12 or the map. However, the usage of the estimated imaging direction of the moving camera 20 is arbitrary, and it is not limited to a way of use described in Example Embodiment 1.

Hereinafter, the surveillance information generation apparatus 2000 of the present example embodiment will be described in more detail.

<Flow of Process>

Figure 19:
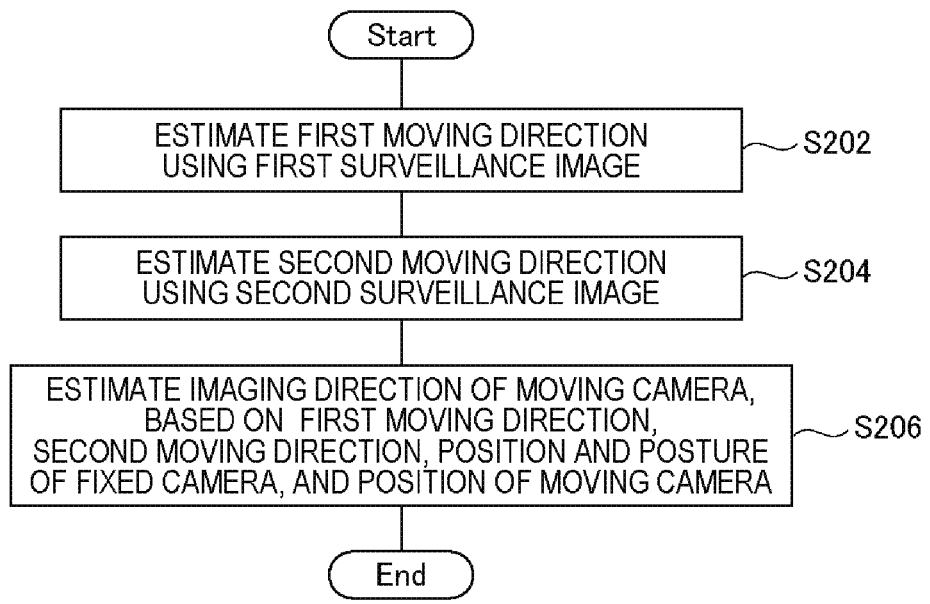
FIG. 19 is a flowchart illustrating a flow of a process executed by the surveillance information generation apparatus of Example Embodiment 2.

FIG. 19 is a flowchart illustrating the flow of a process executed by the surveillance information generation apparatus 2000 of Example Embodiment 2. The first moving direction estimation unit 2100 estimates the first moving direction using the first surveillance image 12 (S202). The second moving direction estimation unit 2120 estimates the second moving direction using the second surveillance image 22 (S204). The imaging direction estimation unit 2140 estimates the imaging direction of the moving camera 20, based on the first moving direction, the second moving direction, the position and pose of the fixed camera 10, and the position of the moving camera 20 (S206).

<Details of First Moving Direction Estimation Unit 2100>

The first moving direction estimation unit 2100 estimates the first moving direction which is the moving direction of the crowd in the first surveillance image 12 (S202). Here, there are various ways in which the first moving direction estimation unit 2100 estimates the first moving direction. Hereinafter, the estimation method of the first moving direction will be described.

<<Method 1>>

Figure 20:
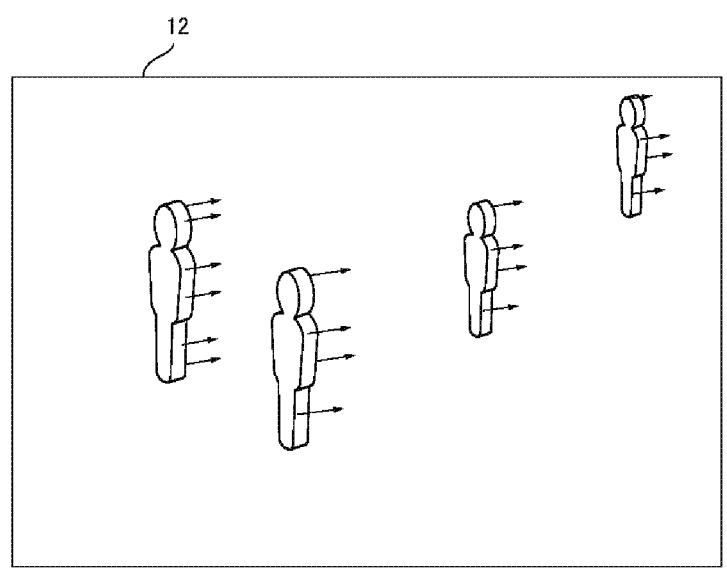
FIG. 20 is a diagram illustrating an optical flow calculated for a first surveillance image.

The first moving direction estimation unit 2100 calculates the optical flow of pixels or feature points included in each of a plurality of first surveillance images 12 arranged in time series. FIG. 20 is a diagram illustrating an optical flow calculated for the first surveillance image 12. Each arrow shown in FIG. 20 represents the optical flow calculated for the first surveillance image 12.

The first moving direction estimation unit 2100 estimates the first moving direction, based on the calculated optical flow. For example, the first moving direction estimation unit 2100 selects one from the optical flows, and handles the selected optical flow as the first moving direction. For example, the first moving direction estimation unit 2100 randomly selects one optical flow.

For example, the first moving direction estimation unit 2100 calculates one vector by statistically processing the plurality of calculated optical flows, and handles the vector as the first moving direction. The statistical process is, for example, a process of calculating an average of vectors.

Note that, since the technique for calculating the optical flow using the pixels or feature points included in the image is a well-known technique, a detailed description of this technique will be omitted.

<<Method 2>>

Figure 21:
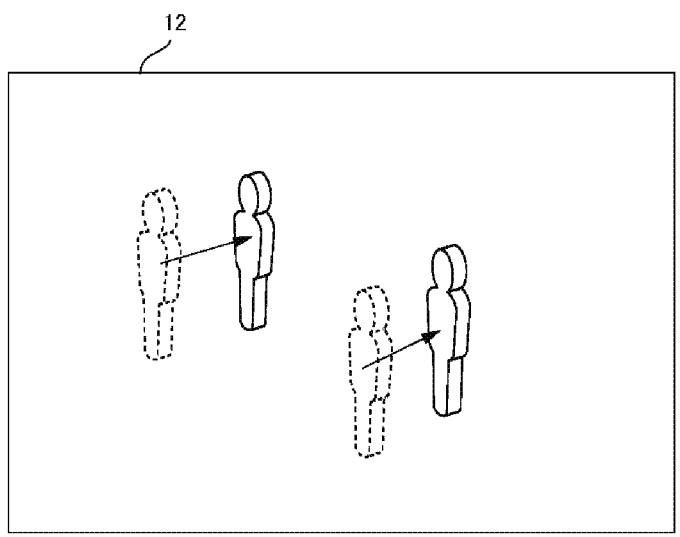
FIG. 21 is a diagram illustrating a change in the position of an object.

The first moving direction estimation unit 2100 detects an object captured in common in the plurality of first surveillance images 12 arranged in time series, and estimates a first moving direction based on a change in the position of the object. FIG. 21 is a diagram illustrating a change in the position of an object. In FIG. 21, the object represented by the dotted line is captured in the t-th first surveillance image 12, and the object represented by the solid line is captured in the (t+1)-th first surveillance image 12. Arrows represent changes in the position of each object. The change in the position of the object is, for example, a vector connecting the centers of gravity of a plurality of regions representing the same object.

Note that, in a case where a plurality of objects are captured in the first surveillance image 12, as in the case of using the above-described optical flow, a plurality of vectors representing the change in the position of the object are calculated. Therefore, for example, the first moving direction estimation unit 2100 selects one from a plurality of objects, and handles a vector representing a change in the position of the selected object as a first moving direction. For example, the first moving direction estimation unit 2100 randomly selects one object. For example, the first moving direction estimation unit 2100 selects the largest object.

For example, the first moving direction estimation unit 2100 calculates one vector by statistically processing a plurality of vectors representing the change in the position of a plurality of objects, and handles the vector as the first moving direction. The statistical process is, for example, a process of calculating an average of vectors.

<<Method 3>>

For example, the first moving direction estimation unit 2100 may detect the moving direction of the crowd, based on the orientation of the object captured in the first surveillance image 12. For example, in a case where the object is a person or an animal, the first moving direction estimation unit 2100 determines the orientation of these faces and bodies, and handles the direction in which the face or the front of the body faces as the first moving direction. In a case where the object is a car, motorbike, or object such as a flying object, the first moving direction estimation unit 2100 determines a forwarding direction of the object from the shape of the object captured in the first surveillance image 12 and the positions of various parts (such as a bumper and a steering wheel), and handles the determined forwarding direction as the first moving direction.

<Details of Second Moving Direction Estimation Unit 2120>

A method in which the second moving direction estimation unit 2120 estimates the moving direction (second moving direction) of the crowd captured in the second surveillance image 22 is the same as the method in which the first moving direction estimation unit 2100 estimates the first moving direction.

<About Reduction of Blurring>

In the first surveillance image 12 and the second surveillance image 22, the crowd may be blurred. For example, if the fixed camera 10 or the moving camera 20 images a moving crowd, the crowd may be blurred in each surveillance image. For example, in a case of performing imaging with the fixed camera 10 while changing the pose of the fixed camera 10, or in a case of performing imaging with the moving camera 20 while changing the pose or the position of the moving camera 20, the crowd may be blurred in each surveillance image.

Thus, it is preferable that the first moving direction estimation unit 2100 estimates the first moving direction after applying a process for reducing blur (so-called image stabilization) to each first surveillance image 12. Likewise, it is preferable that the second moving direction estimation unit 2120 estimates the second moving direction after applying a process for reducing blur to each second surveillance image 22.

<Details of Imaging Direction Estimation Unit 2140>

The imaging direction estimation unit 2140 estimates the imaging direction of the moving camera 20, based on the first moving direction, the second moving direction, the position and pose of the fixed camera 10, and the position of the moving camera 20 (S206). FIG. 22 is a diagram for explaining an operation of the imaging direction estimation unit 2140. Hereinafter, using FIG. 22, a specific process in which the imaging direction estimation unit 2140 estimates the imaging direction of the moving camera 20 will be described.

First, the imaging direction estimation unit 2140 maps the first moving direction on a plane (for example, on the map) of a plan view of the place to be surveilled viewed in the vertical direction. In FIG. 22, the plane 70 is a plane of a plan view of the place to be surveilled viewed in the vertical direction. The moving direction 80 represents the direction in which the moving direction of the crowd in the first surveillance image 12 is mapped to the plane 70. Note that, the plane 70 is a plane having the upward direction as the north.

The imaging direction estimation unit 2140 calculates a moving direction (hereinafter, referred to as a third moving direction) on the plane 70 of the object captured in the moving camera 20, using the moving direction 80. In a case where the imaging range of the fixed camera 10 and the imaging range of the moving camera 20 overlap, the third moving direction is the same as the moving direction 80. FIG. 22 shows a case where the imaging range of the fixed camera 10 and the imaging range of the moving camera 20 overlap. A process for a case where the imaging range of the fixed camera 10 and the imaging range of the moving camera 20 do not overlap will be described later.

The imaging direction estimation unit 2140 determines an imaging direction of the moving camera 20 as the estimation result, from a plurality of candidates (hereinafter, referred to as candidate imaging directions) of the imaging direction of the moving camera 20. First, the imaging direction estimation unit 2140 calculates the moving direction (hereinafter, referred to as a candidate moving direction) of the crowd captured in the moving camera 20, which is assumed to be observed when viewing the candidate imaging direction from the position of the moving camera 20, for each candidate imaging direction.

In FIG. 22, the candidate imaging direction 92 is eight directions: north, northeast, east, southeast, south, southwest, west, and northwest. The candidate moving directions 94-1 to 3 are candidate moving directions in the case of viewing the candidate imaging directions 92-1, 92-2, and 92-3 from the position of the moving camera 20, respectively. Note that, in this example, since little or no crowd can be viewed by viewing the candidate imaging directions other than the above three directions from the position of the moving camera 20, the candidate imaging directions other than the above three directions are omitted.

The imaging direction estimation unit 2140 performs matching between each candidate moving direction and the second moving direction. In FIG. 22, the second moving direction is the second moving direction 95. Specifically, the imaging direction estimation unit 2140 estimates that the candidate imaging direction 92 corresponding to the candidate moving direction 94 having a highest degree of equivalence to the second moving direction 95 is the imaging direction of the moving camera 20. In FIG. 22, the candidate moving direction 94 having a highest degree of equivalence to the second moving direction 95 is the candidate moving direction 94-2. Therefore, the imaging direction estimation unit 2140 estimates that the candidate imaging direction 92-2 corresponding to the candidate moving direction 94-2 is the imaging direction of the moving camera 20.

Figure 23:
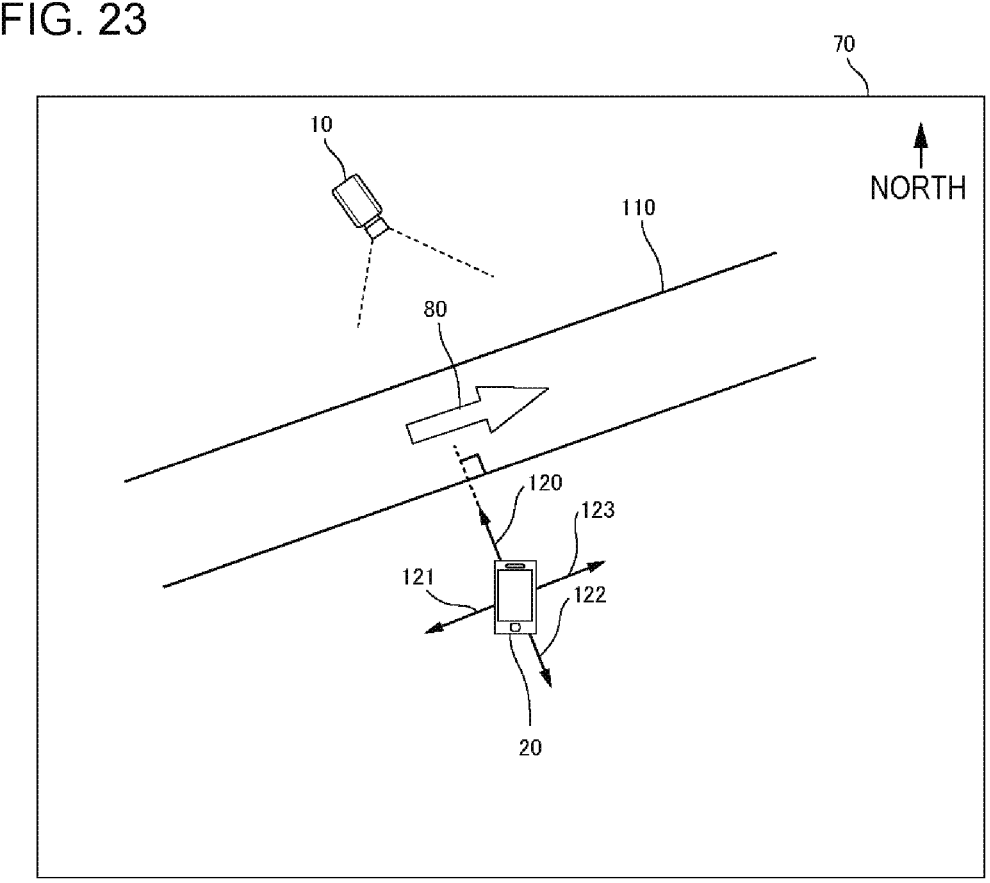
FIG. 23 is a diagram for explaining a method of determining a candidate imaging direction with reference to a direction of a sidewalk.

Note that, candidates of the imaging directions are not limited to the above eight directions. For example, candidates of the imaging directions may be four directions: north, east, south, and west. Further, the candidate imaging directions are not limited to the direction for which generic names such as east, west, north and south are defined. For example, the imaging direction estimation unit 2140 determines the candidate imaging direction with reference to the direction of the sidewalk or the like in the vicinity of the moving camera 20. FIG. 23 is a diagram for explaining a method of determining a candidate imaging direction with reference to a direction of a sidewalk. In FIG. 23, the moving camera 20 is located near the sidewalk 110. Therefore, a surveillant or the like who surveils a crowd moving through the sidewalk 110 is considered to surveil the crowd, with the direction 120, which is the normal direction of the sidewalk 110, as the front direction.

Therefore, for example, the imaging direction estimation unit 2140 determines each candidate imaging direction with reference to the direction 120, which is the normal direction of the direction of the sidewalk 110. For example, the imaging direction estimation unit 2140 handles four directions of a direction 120, a direction 121 rotated from the direction 120 by +90 degrees, a direction 122 rotated from the direction 120 by +180 degrees, and a direction 123 rotated from the direction 120 by +270 degrees, as candidate imaging directions.

Note that, in a case of determining the candidate imaging direction based on the sidewalk or the like which is a surveillance target, the imaging direction estimation unit 2140 has the above-mentioned map information acquisition unit 2080, and uses the map information acquired by the map information acquisition unit 2080.

<<Regarding Case where Imaging Ranges of Fixed Camera 10 and Moving Camera 20 do Not Overlap>>

As described above, the imaging direction estimation unit 2140 calculates a moving direction (a third moving direction) on the plane 70 of the object captured in the moving camera 20, using the moving direction 80. In the aforementioned example, it is assumed that the imaging range of the fixed camera 10 and the imaging range of the moving camera 20 overlap. A case where the imaging range of the fixed camera 10 and the imaging range of the moving camera 20 do not overlap will be described below.

Figure 24:
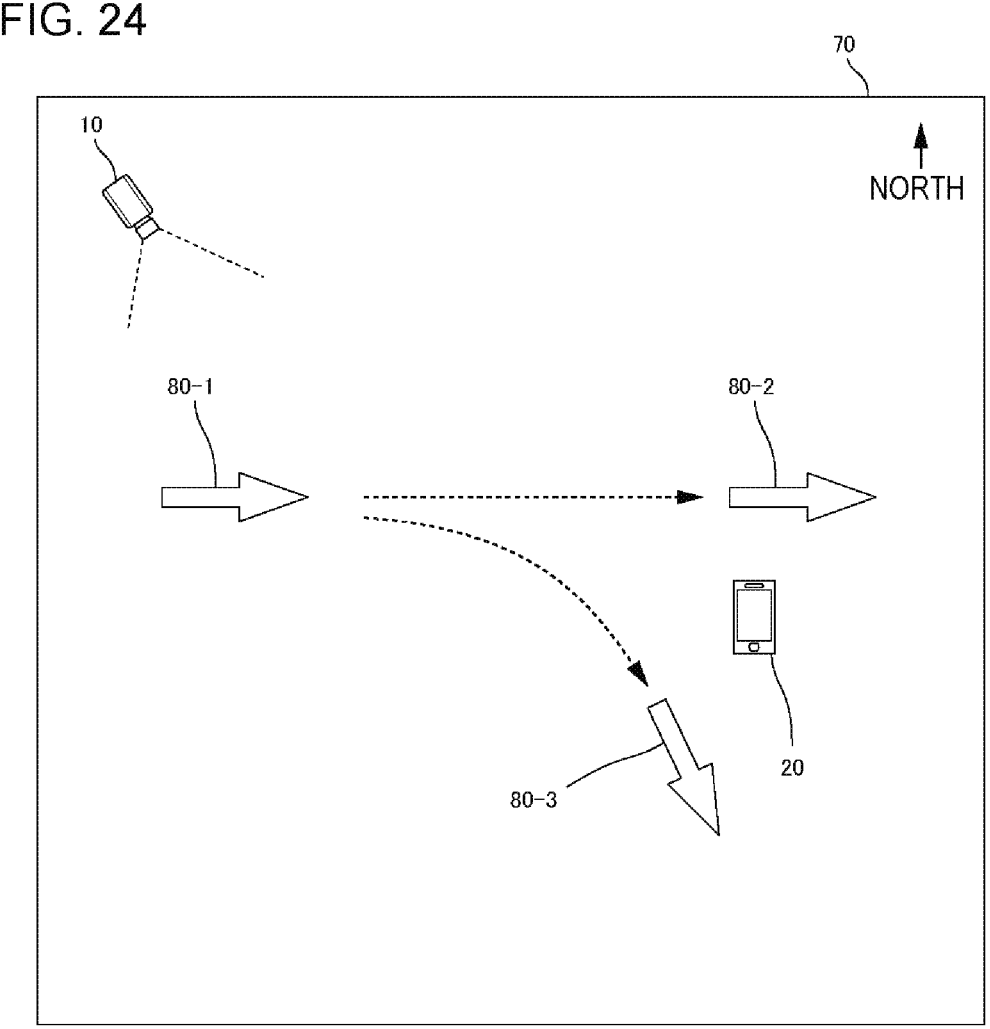
FIG. 24 is a diagram illustrating a case where the imaging ranges of the fixed camera and the moving camera do not overlap.

In a case where the imaging ranges of the fixed camera 10 and the moving camera 20 do not overlap each other, the moving direction on the plane 70 of the crowd captured in the first surveillance image 12 and the moving direction on the plane 70 of the crowd captured in the second surveillance image 22 are not always the same. FIG. 24 is a diagram illustrating a case where the imaging ranges of the fixed camera 10 and the moving camera 20 do not overlap. In FIG. 24, the direction in which the first moving direction is mapped onto the plane 70 is the moving direction 80-1. On the other hand, the moving direction on the plane 70 of the crowd captured in the moving camera 20 is not limited to the moving direction 80-2 which is the same direction as the moving direction 80-1, but is also considered to be the moving direction 80-3 or the like.

Thus, for example, the imaging direction estimation unit 2140 acquires the map information of the place to be surveilled, and calculates the moving direction of the crowd on the plane 70 captured by the moving camera 20, based on the map information. Specifically, the imaging direction estimation unit 2140 handles, as the moving direction on the plane 70 of the crowd captured by the moving camera 20, a moving direction which is obtained by moving the moving direction on the plane 70 of the crowd captured in the first surveillance image 12 to the vicinity of the moving camera 20 along a route (for example, a sidewalk or the like) along which the crowd is supposed to move on the map.

Figure 25:
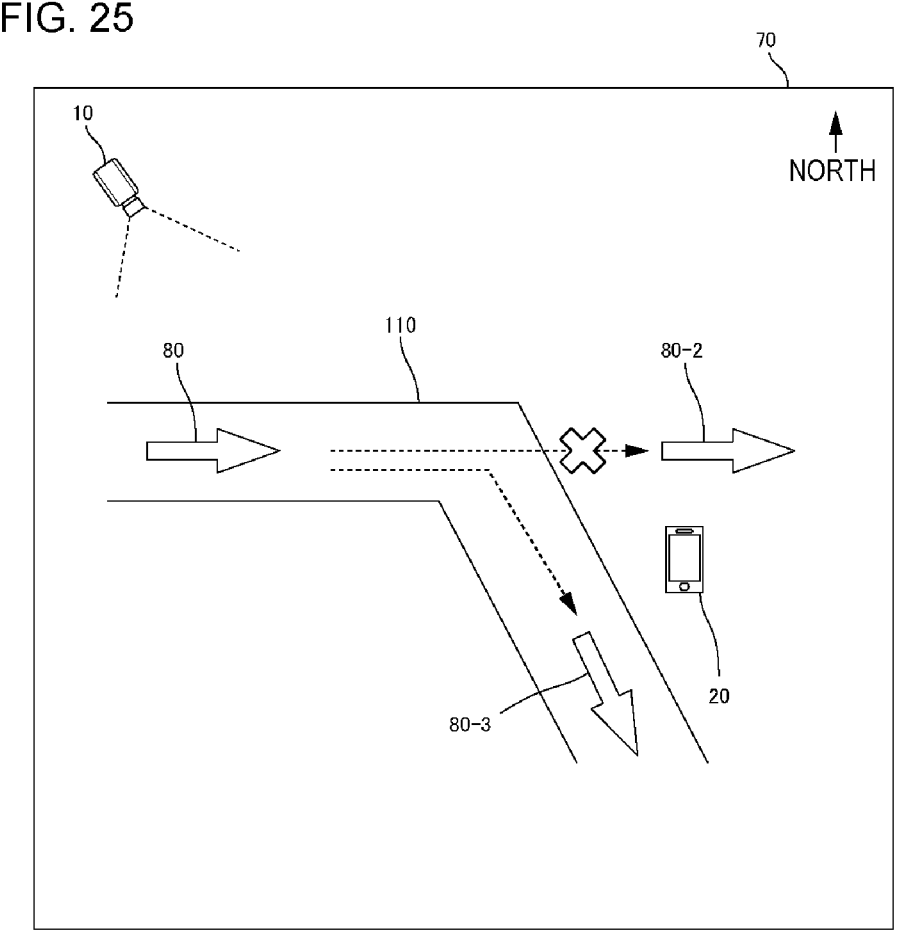
FIG. 25 is a diagram for explaining a method of estimating a moving direction on a plane of a crowd using map information.

FIG. 25 is a diagram for explaining a method of estimating a moving direction on the plane 70 of a crowd using map information. In this example, the object is a person. In FIG. 25, the sidewalk 110 is a sidewalk on which a person walks. In this case, when moving the moving direction 80-1 (the moving direction on the plane 70 of the crowd captured in the first surveillance image 12) along the sidewalk 110, the moving direction on the plane 70 of the crowd in the vicinity of the moving camera 20 becomes the moving direction 80-3. Therefore, the imaging direction estimation unit 2140 handles the moving direction 80-3 as the third moving direction. More specifically, the imaging direction estimation unit 2140 handles a vector that is the moving direction 80-1 being moved along the line to the point where the distance between the line passing through the center of the sidewalk and the position of the moving camera 20 is shortest, as a third moving direction.

Figure 26:
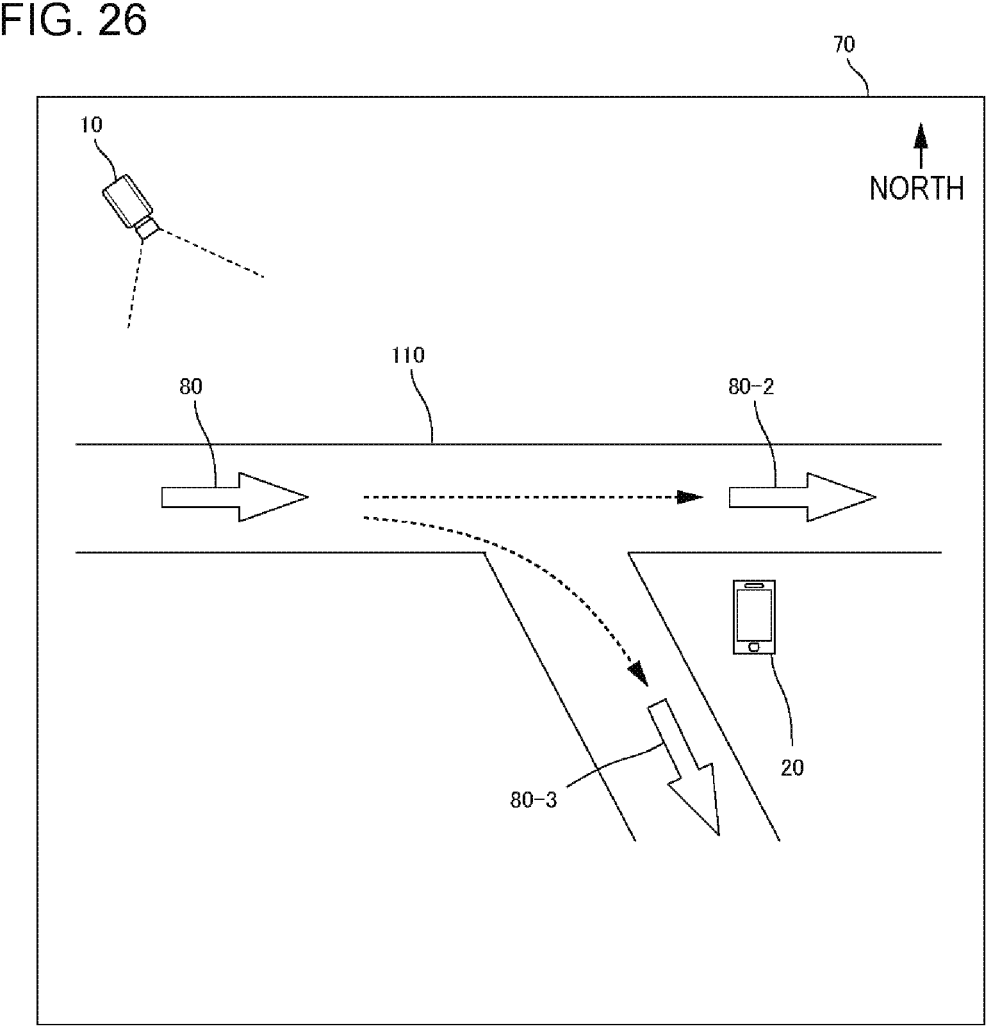
FIG. 26 is a diagram illustrating a case where the crowd has a plurality of moving routes.

However, in a case where there is a plurality of moving routes of the crowd that can be recognized from the map information, it may not be known which moving route a crowd moves, in some cases. FIG. 26 is a diagram illustrating a case where the crowd has a plurality of moving routes. In FIG. 26, since the sidewalk 110 diverges, the crowd can move in either the moving direction 80-2 or the moving direction 80-3.

Figure 27:
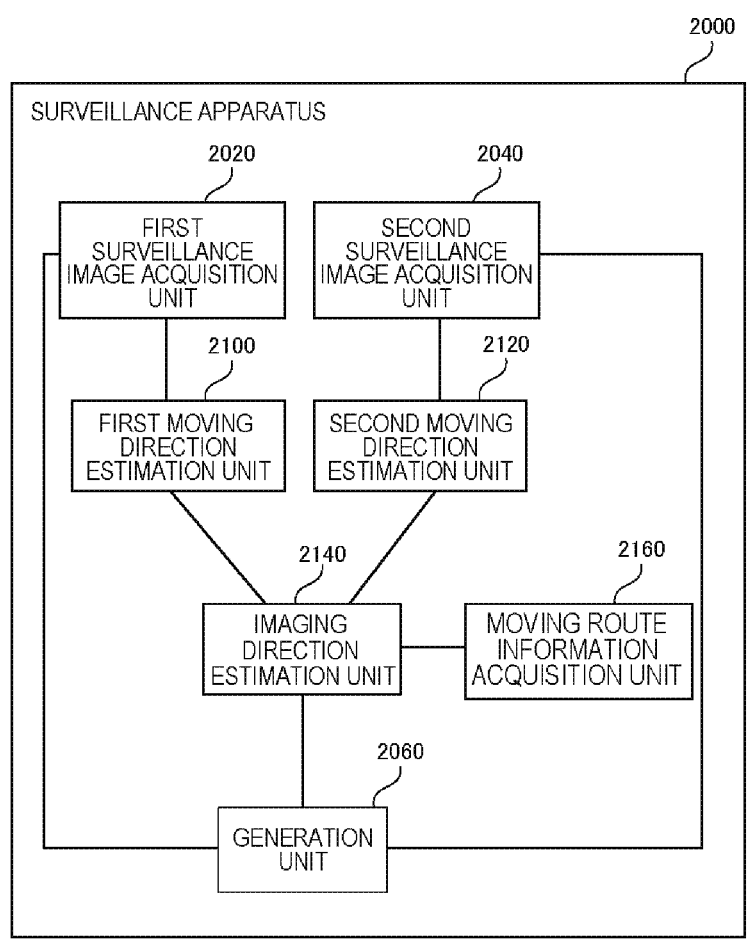
FIG. 27 is a block diagram illustrating a surveillance information generation apparatus including a moving route information acquisition unit.

In such a case, the imaging direction estimation unit 2140 acquires the moving route information on the moving route of the crowd. To do so, the surveillance information generation apparatus 2000 includes a moving route information acquisition unit 2160. FIG. 27 is a block diagram illustrating the surveillance information generation apparatus 2000 including the moving route information acquisition unit 2160.

The moving route information indicates a direction in which the crowd moves. For example, in a case where the event is held at the event venue, it is considered that the crowd moves from the nearest station of the event venue to the event venue. In addition, in a case where events requiring surveillance or the like are performed as described above, in order to prevent an accident, crowd guidance is generally performed so that the crowd moves to the event venue along a predetermined route. Thus, the moving route information indicates a predetermined moving route of the crowd in this way.

Figure 28:
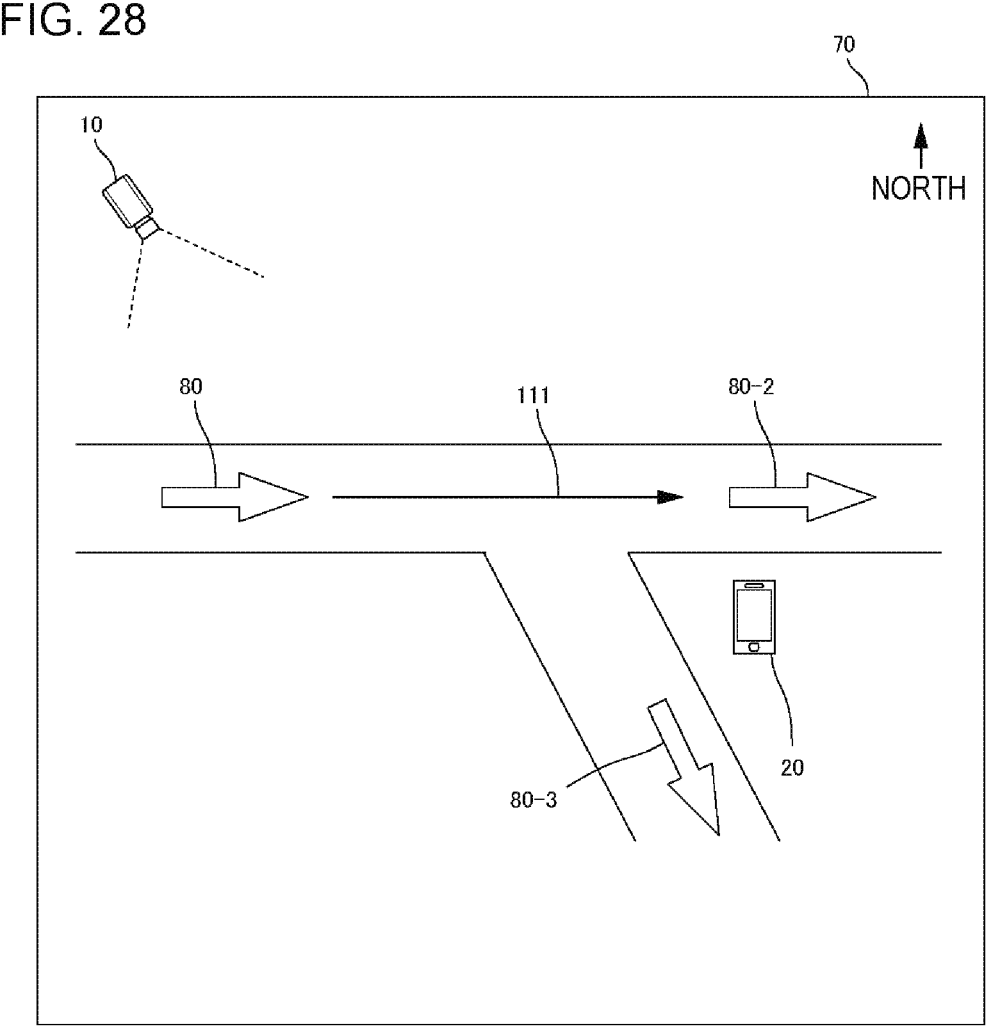
FIG. 28 is a diagram for explaining a method of estimating a moving direction of the crowd using moving route information.

FIG. 28 is a diagram exemplifying a process of estimating the moving direction of the crowd using the moving route information. The moving route information acquired in FIG. 28 is a map and information indicating the moving route on the map. Even in the map indicated by the moving route information, the sidewalk 110 diverges, as in FIG. 26. Here, a route 111 is described in the moving route information acquired by the imaging direction estimation unit 2140. Thus, the imaging direction estimation unit 2140 handles the moving direction 80-2 in which the moving direction 80-1 is moved along the route 111, as the third moving direction.

Note that, there may be more than one piece of moving route information about a specific place. For example, in a case of the above-mentioned event venue, the crowd moves from the nearest station to the event venue before the event starts, and the crowd moves from the event venue to the nearest station after the event ends. Thus, for example, the moving route information acquisition unit 2160 acquires the combination of "moving route of the crowd and a time slot during which the movement occurs" as moving route information. Here, it is assumed that the moving route information is stored in advance in the storage apparatus or the like accessible from the moving route information acquisition unit 2160.

Note that, in a case of using the moving route information, the imaging direction estimation unit 2140 may not use the first surveillance image 12 for estimation of the imaging direction. In this case, the imaging direction estimation unit 2140 estimates the moving direction on the plane 70 of the crowd captured in the second surveillance image 22, from the moving route of the crowd indicated by the moving route information. For example, in FIG. 28, the imaging direction estimation unit 2140 may estimate that the moving direction on the plane 70 of the crowd captured in the second surveillance image 22 is a moving direction 80-2, based on the route 111, without using the moving direction 80-1.

<<Narrowing Down of Candidate Imaging Direction>>

Further, the imaging direction estimation unit 2140 may narrow down the candidate imaging direction, before calculating the candidate moving direction corresponding to the candidate imaging direction and performing matching with the second moving direction. Thereby, since the number of times of matching can be reduced, there is an effect that it is possible to reduce the calculation amount of the process of the imaging direction estimation unit 2140. Hereinafter, several methods for narrowing down candidate imaging directions will be exemplified.

<<<Narrowing Down Method Using Electronic Compass>>>

The imaging direction estimation unit 2140 narrows down candidate imaging directions using an electronic compass. Specifically, the imaging direction estimation unit 2140 excludes from the candidate imaging direction, a direction having a large difference in angle from the direction indicated by the electronic compass.

Figure 29:
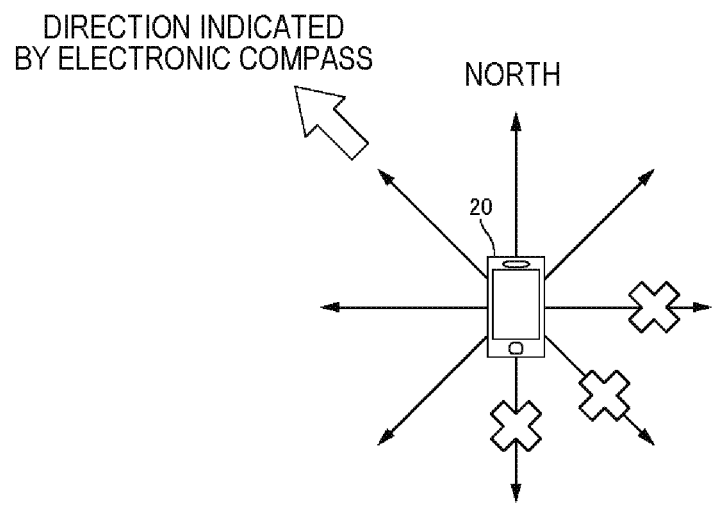
FIG. 29 is a diagram for explaining a method of narrowing down candidate imaging directions using an electronic compass.

FIG. 29 is a diagram for explaining a method of narrowing down candidate imaging directions using an electronic compass. In FIG. 29, the candidate imaging direction is eight directions such as north and northwest. Further, the electronic compass shows northwest. In this case, due to lack of accuracy of the electronic compass, it is likely that the imaging direction of the actual moving camera 20 is north or west. On the other hand, it is unlikely that the south east, which is the opposite of the direction indicated by the electronic compass, is the imaging direction of the moving camera 20.

Thus, the imaging direction estimation unit 2140 excludes, from the candidate imaging direction, the southeast or the like having a large difference in angle from the direction indicated by the electronic compass. Here, it is assumed that a predetermined number representing the number of directions excluded from the candidate imaging direction is determined in advance.

If the predetermined number is, for example, 3, the imaging direction estimation unit 2140 excludes southeast, south, and east from the candidate imaging direction. If the predetermined number is 5, the imaging direction estimation unit 2140 excludes southeast, south, east, southwest, and northeast from the candidate imaging direction. In FIG. 29, southeast, south, and east are excluded from the candidate imaging direction.

<<<Narrowing Down Method Using Background Captured in Second Surveillance Image 22>>>

The imaging direction estimation unit 2140 narrows down the candidate imaging direction, based on the background captured in the second surveillance image 22. For example, the imaging direction estimation unit 2140 excludes candidate imaging directions in which the background captured in the second surveillance image 22 is predicted not to be included in the angle of view of the moving camera 20.

Figure 30:
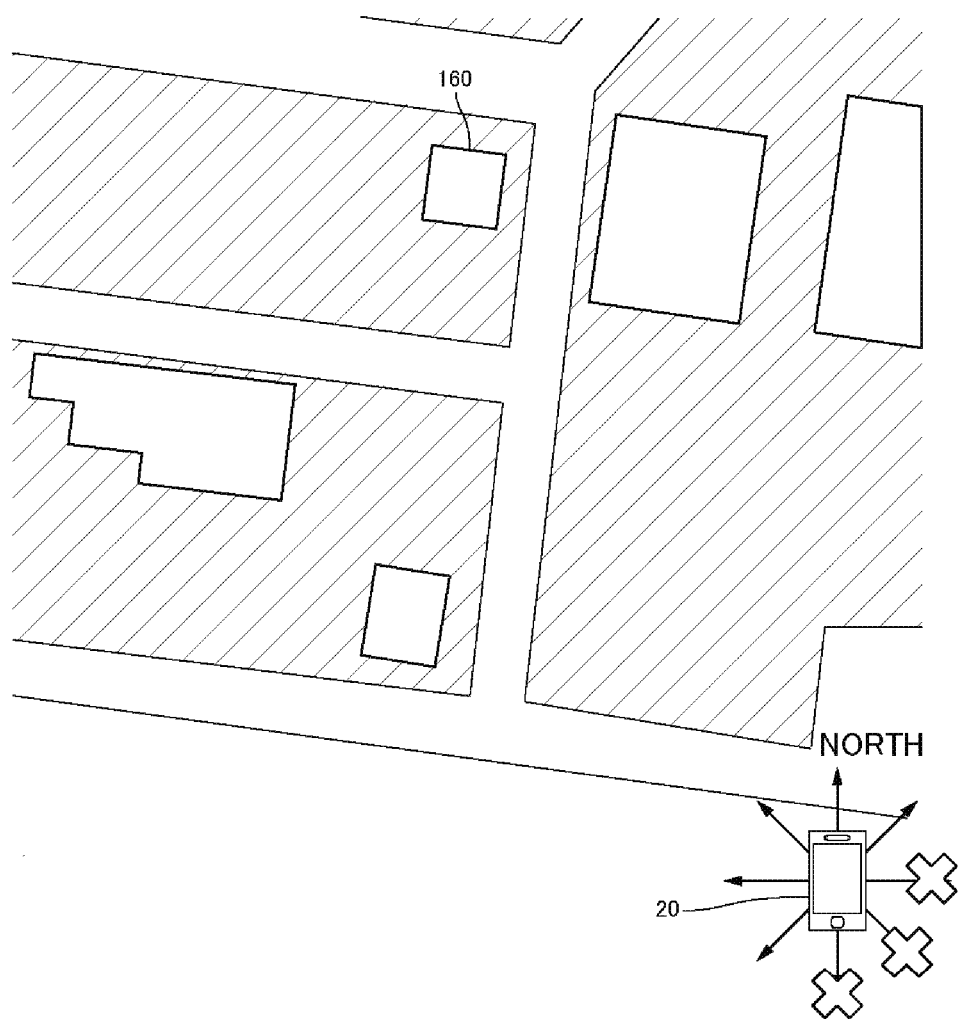
FIG. 30 is a diagram for explaining a method of narrowing down candidate imaging directions based on the background captured in the second surveillance image.

FIG. 30 is a diagram for explaining a method of narrowing down candidate imaging directions based on the background captured in the second surveillance image 22. FIG. 30 shows a map of the surroundings of a surveillance target. Here, it is assumed that the building 160 is captured in the second surveillance image 22. In this case, for example, in a case where the imaging direction of the moving camera 20 is in the southeast, the building 160 is not captured in the second surveillance image 22. On the other hand, if the imaging direction of the moving camera 20 is the northwest, it is considered that the building 160 is captured in the second surveillance image 22.

Thus, the imaging direction estimation unit 2140 extracts backgrounds representing characteristic buildings, signboards, and the like around the surveillance target, from the background captured in the second surveillance image 22 in this way. Then, the imaging direction estimation unit 2140 excludes candidate imaging directions with a low possibility of capturing the extracted background, from the relationship between the position of the extracted background on the map and the position of the moving camera 20. Specifically, the imaging direction estimation unit 2140 excludes a candidate imaging direction that is largely different in angle from the direction starting from the position of the moving camera 20 and ending at the position on the map of the extracted background. For example, the imaging direction estimation unit 2140 excludes a predetermined number of candidate imaging directions, similar to the excluding of the candidate imaging direction using the electronic compass described above. In FIG. 30, southeast, south, and east are excluded from the candidate imaging direction.

Figure 31A:
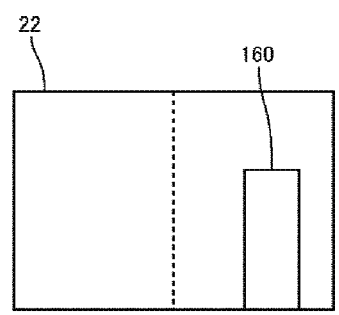
FIGS. 31A and 31B are diagrams for explaining a method of narrowing down candidate imaging directions based on the position of a specific background on the second surveillance image.
Figure 31B:
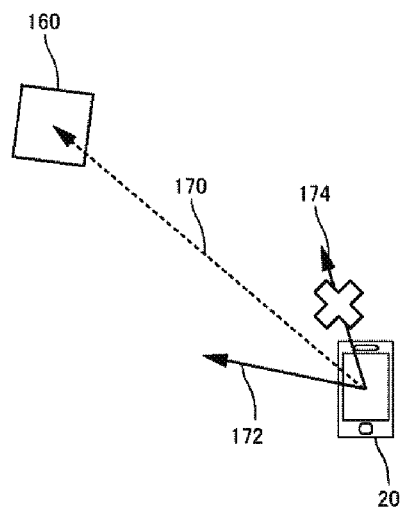

For example, the imaging direction estimation unit 2140 may also narrow down the candidate imaging direction, based on the position of the extracted background in the second surveillance image 22. FIGS. 31A and 31B are diagrams for explaining a method of narrowing down candidate imaging directions based on the position of a specific background on the second surveillance image 22. FIG. 31A shows the second surveillance image 22, and FIG. 31B shows the positional relationship between the moving camera 20 and the building 160 on the map. In the second surveillance image 22 of FIG. 31A, the building 160 is captured on the right side of the center of the second surveillance image 22. In this case, the imaging direction of the moving camera 20 is a direction rotated by a + angle from the direction (direction 170) connecting the position of the moving camera 20 and the position of the building 160 on the map.

Thus, the imaging direction estimation unit 2140 excludes candidate imaging directions in which the angle formed by the direction connecting the position of the moving camera 20 and the position of the building 160 on the map is in the range between −0 degrees and −180 degrees including −0 degrees and −180 degrees. For example, in the case of FIG. 31B, the candidate imaging direction 174 is excluded from the candidate imaging directions, and the candidate imaging direction 172 is not excluded from the candidate imaging directions.

<<Comprehensive Estimation of Imaging Direction of Moving Camera 20>>

The imaging direction estimation unit 2140 may estimate the imaging direction of the moving camera 20 a plurality of times within a predetermined period, and comprehensively estimate the imaging direction of the moving camera 20, based on the plurality of estimation results. For example, it is assumed that the imaging direction estimation unit 2140 calculates the comprehensive estimation result of the imaging direction of the moving camera 20 every second. Further, it is assumed that the fixed camera 10 and the moving camera 20 are cameras performing imaging at a frequency of 30 frames per second (30 fps). In this case, the imaging direction estimation unit 2140 estimates the imaging direction of the moving camera 20 every time when the first surveillance image 12 and the second surveillance image 22 are generated, thereby estimating the imaging direction of the moving camera 20 30 times per second. A comprehensive estimation result is calculated, based on the estimation result of 30 times.

Specifically, the imaging direction estimation unit 2140 statistically processes a plurality of estimation results calculated during a predetermined period to estimate the imaging direction of the moving camera 20. For example, the imaging direction estimation unit 2140 handles the mode of the plurality of estimation results as the imaging direction of the moving camera 20. As an example, it is assumed that the breakdown of the estimation results made 30 times per second is "north: 20 times, northwest: 8 times, northeast: 2 times". In this case, the imaging direction estimation unit 2140 estimates that the most frequently calculated north is the imaging direction of the moving camera 20 during one second.

For example, the imaging direction estimation unit 2140 may calculate an average value of a plurality of estimation results and may handle the average value as the imaging direction of the moving camera 20. Specifically, the imaging direction estimation unit 2140 represents each of the estimated directions of the moving camera 20 calculated a plurality of times by a numerical value with east as +0 degrees, calculates the average value of these numerical values, and handles these numerical values as the imaging direction of the moving camera 20.

Note that, in the case of calculating a comprehensive estimation result by using estimation results performed a plurality of times during a predetermined period, the imaging direction estimation unit 2140 may calculate the comprehensive estimation result by using only the results with high reliability among a plurality of estimation results. For example, it is assumed that the imaging direction estimation unit 2140 calculates the comprehensive estimation result of the imaging direction of the moving camera 20 once per second. It is assumed that the fixed camera 10 and the moving camera 20 are cameras performing imaging at 30 fps.

In this case, the imaging direction estimation unit 2140 estimates the imaging direction of the moving camera 20 every time when the first surveillance image 12 and the second surveillance image 22 are generated, thereby estimating the imaging direction of the moving camera 20 30 times per second. Next, the imaging direction estimation unit 2140 divides the estimation results of 30 times per second into groups of ten consecutive times in time series.

Then, the imaging direction estimation unit 2140 calculates the comprehensive estimation result of the imaging direction of the moving camera 20 during one second, using a group with high reliability among three groups.

The above-mentioned reliability of a group is determined, for example, based on the magnitude of variance of the estimation result within the group. In a case where the variance of the estimation result is large, since the estimated imaging direction of the moving camera 20 varies largely, the reliability of the estimation result is considered to be low. On the other hand, in a case where the variance of the estimation result is small, since the estimated imaging direction of the moving camera 20 varies small, the reliability of the estimation result is considered to be high. Therefore, for example, the imaging direction estimation unit 2140 calculates variance of the estimation result within the group by representing each estimation result as a numerical value with east as +0 degrees. Then, the imaging direction estimation unit 2140 calculates the comprehensive estimation result, by using only the estimation result included in the group in which the calculated variance is the predetermined value or less.

<<<Use of Change in Flow of Crowd>>>

Figure 32A:
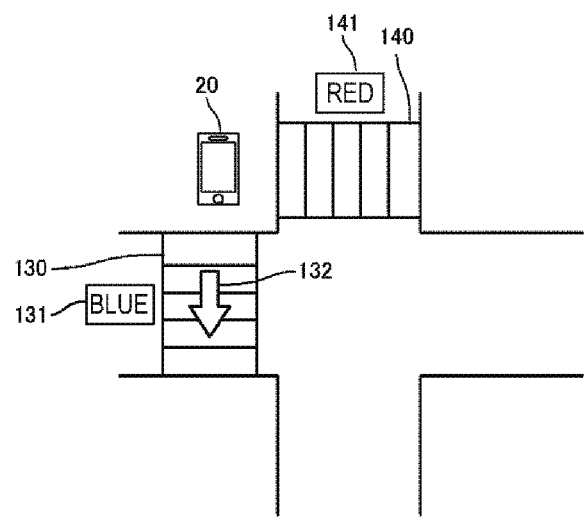
FIGS. 32A and 32B are diagrams illustrating an example in which the flow of the crowd changes near an intersection.
Figure 32B:
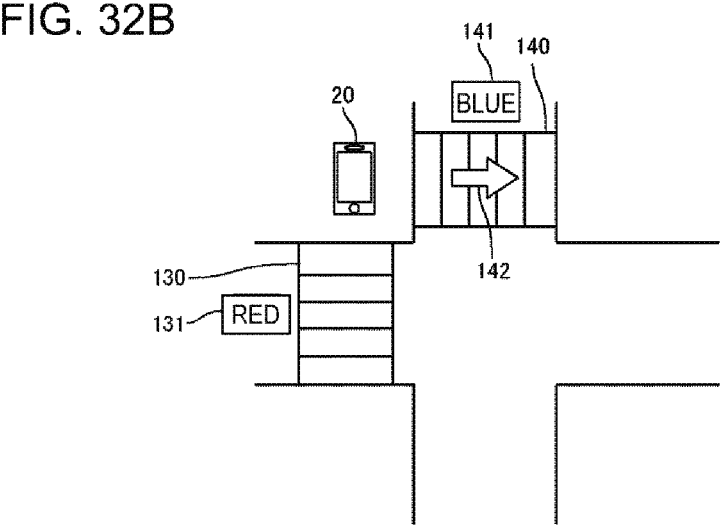

Depending on the place, the flow of the crowd may change periodically or irregularly. For example, in the vicinity of the intersection, the flow of the crowd changes according to switching of traffic lights. FIGS. 32A and 32B are diagrams illustrating an example in which the flow of the crowd changes near an intersection. In FIGS. 32A and 32B, a scene in which the intersection in plan view in the vertical direction is shown. At a certain time, it is assumed that the signal 131 of a pedestrian crossing 130 is blue and the signal 141 of a pedestrian crossing 140 is red. In this case, the crowd flows to, for example, the direction 132 because it crosses the pedestrian crossing 130. Thereafter, it is assumed that the signal 131 becomes red and the signal 141 becomes blue. In this case, the crowd flows to, for example, the direction 142 because it crosses the pedestrian crossing 140.

In a case where the flow of the crowd changes in this way, the imaging direction estimation unit 2140 may estimate the imaging direction of the moving camera 20 for each of before and after the change, and estimate the imaging direction of the moving camera 20 comprehensively from the result. Specifically, the imaging direction estimation unit 2140 estimates the imaging direction of the moving camera 20 for each of before and after the crowd flow, by using the first surveillance image 12 and the second surveillance image 22 imaged before and after the change in the crowd flow. Then, the imaging direction estimation unit 2140 calculates the final estimation result by statistically processing the estimated imaging direction.

For example, in the example of FIGS. 32A and 32B, if the imaging direction estimation unit 2140 estimates the imaging direction of the moving camera 20 in a case where the crowd flows in the direction 132, it is assumed that candidate moving directions having a high degree of equivalence to the second moving direction are north and northwest. Next, if the imaging direction estimation unit 2140 estimates the imaging direction of the moving camera 20 in a case where the crowd flows in the direction 142, it is assumed that candidate moving directions having a high degree of equivalence to the second moving direction are north and northeast. In this case, the imaging direction estimation unit 2140 estimates that north that has a high degree of equivalence (which is the mode) to the second moving direction in both of the case where the crowd flows in the direction 132 and the case where the crowd flows in the direction 142, as the imaging direction of the moving camera 20.

<<Following Change in Imaging Direction of Moving Camera 20>>

The imaging direction of the moving camera 20 may change. Therefore, it is preferable that the imaging direction estimation unit 2140 repeatedly estimates the imaging direction of the moving camera 20. For example, the imaging direction estimation unit 2140 repeatedly estimates the imaging direction of the moving camera 20 at a frequency such as once per second or once per 10 seconds.

However, once the imaging direction of the moving camera 20 has been estimated by the method described above, the imaging direction estimation unit 2140 can estimate subsequent imaging directions of the moving camera 20, based on subsequent changes in the imaging direction of the moving camera 20. Specifically, the imaging direction estimation unit 2140 calculates a change in the imaging direction of the moving camera 20, and is able to estimate the imaging direction of the moving camera 20 after the change, based on the calculated change and the imaging direction of the moving camera 20 estimated before the change. For example, the imaging direction estimation unit 2140 estimates that the imaging direction of the moving camera 20 is north at time t. Next, it is assumed that after t1 second, the imaging direction estimation unit 2140 calculates that the imaging direction of the moving camera 20 has changed by +45 degrees. In this case, the imaging direction estimation unit 2140 estimates that the imaging direction of the moving camera 20 at time t+t1 is northwest.

Therefore, the imaging direction estimation unit 2140 may realize a part of the processes of estimating the imaging direction of the moving camera 20, which are repeatedly performed, by the process of estimating the imaging direction of the moving camera 20 based on the change in the imaging direction of the moving camera 20. Hereinafter, the process of estimating the imaging direction of the moving camera 20 using the first moving direction and the second moving direction is referred to as the first estimation process, and the process of estimating the imaging direction of the moving camera 20 by calculating the change in the imaging direction of the moving camera 20 is referred to as the second estimation process.

Figure 33:
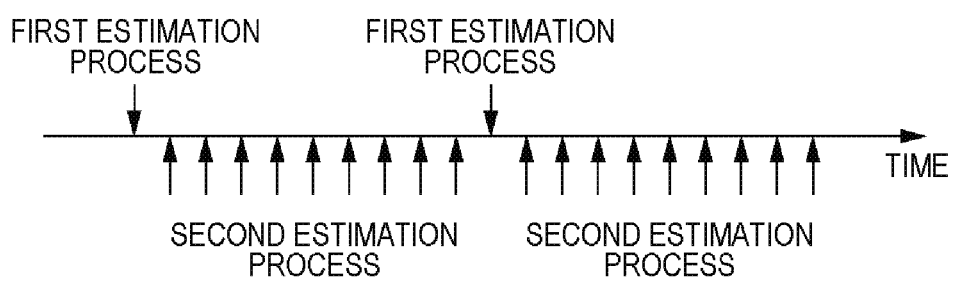
FIG. 33 is a diagram illustrating breakdown of an estimation process of the imaging direction of the moving camera executed by the imaging direction estimation unit in time series.

FIG. 33 is a diagram illustrating breakdown of an estimation process of the imaging direction of the moving camera 20 executed by the imaging direction estimation unit 2140 in time series. In the example of FIG. 33, the imaging direction estimation unit 2140 estimates the imaging direction of the moving camera 20 once a second. Here, the imaging direction estimation unit 2140 repeats the process "after performing the first estimation process once, the second estimation process is performed nine times". Therefore, the frequency at which the first estimation process is performed is once in 10 seconds.

Note that, as described above, the imaging direction estimation unit 2140 may estimate the imaging direction of the moving camera 20 a plurality of times, and totally estimate the imaging direction of the moving camera 20 based on the estimation results of the plurality of times, in some cases. In this case, in FIG. 33, a process of performing comprehensive estimation of the imaging direction of the moving camera 20 is represented as a single first estimation process.

There are various methods of calculating the change in the imaging direction of the moving camera 20. For example, the change in the imaging direction of the moving camera 20 can be calculated using an acceleration sensor attached to the moving camera 20. By using the acceleration sensor attached to the moving camera 20, it is possible to calculate the relative change of the pose of the moving camera 20, from the change of the output of the acceleration sensor. Thus, for example, the imaging direction estimation unit 2140 calculates a change in the imaging direction of the moving camera 20 at the time t+t1, from the difference between the output of the acceleration sensor when estimating the imaging direction of the moving camera 20 at the time t and the output of the acceleration sensor at the time t+t1.

Figure 34:
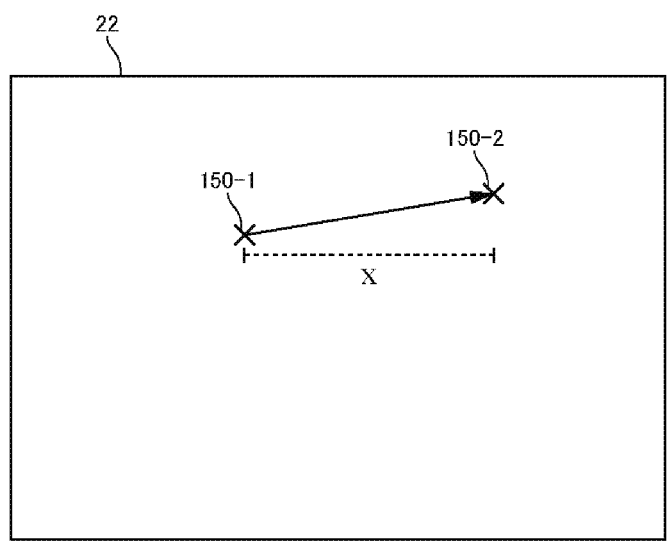
FIG. 34 is a diagram illustrating a change in the position of feature points of the second surveillance image.

For example, a change in the imaging direction of the moving camera 20 can be calculated by tracking the change of the feature points captured in the second surveillance image 22. FIG. 34 is a diagram illustrating a change in the position of feature points of the second surveillance image 22. Here, it is assumed that the feature point captured at the position 150-1 at a certain time t moves to the position 150-2 at the time t+t1. Here, the moving distance in the horizontal direction is x. First, since the feature point moves to the right, it can be known that the imaging direction of the moving camera 20 changes in the + direction. Furthermore, the magnitude of the change in the imaging direction of the moving camera 20 can be known, based on the distance x in the horizontal direction in which the feature point has moved and the angle of view of the moving camera 20. Therefore, the imaging direction estimation unit 2140 can calculate the change of the imaging direction of the moving camera 20, based on the direction in which the imaging direction of the moving camera 20 has changed and the magnitude of the change.

The calculation amount in the second estimation process (a process of estimating the imaging direction of the moving camera 20 by utilizing the change in the imaging direction of the moving camera 20) is smaller than the calculation amount in the first estimation process (a process of calculating the first moving direction and the second moving direction and estimating the imaging direction of the moving camera 20). Therefore, in a case of calculating the imaging direction of the moving camera 20 repeatedly, there is an effect of reducing the processing load of the surveillance information generation apparatus 2000 by using the first estimation process and the second estimation process together.

<About Correction of Inclination of Surveillance Image>

It is preferable that the first moving direction estimation unit 2100, the second moving direction estimation unit 2120, and the imaging direction estimation unit 2140 perform the above-described process after correcting the inclinations in the vertical direction of the first surveillance image 12 and the second surveillance image 22. For example, the correction of the inclination in the vertical direction of each image can be performed based on the inclination of the line of a building or the like captured in the image. For example, in a case where the building is captured in the first surveillance image 12, the first moving direction estimation unit 2100 or the like extracts the line in the height direction of the building captured in the first surveillance image 12, and corrects the line so as to be perpendicular to the horizontal direction of the first surveillance image 12 to correct the inclination in the vertical direction of the first surveillance image 12.

In addition, correction of the inclination in the vertical direction of the first surveillance image 12 may be performed using the camera parameter indicating the inclination in the vertical direction of the fixed camera 10. The correction of the inclination of the second surveillance image 22 in the vertical direction may be performed by using the inclination of the moving camera 20 in the vertical direction that can be calculated from the acceleration sensor attached to the moving camera 20.

<Hardware Configuration of Surveillance Information Generation Apparatus 2000>

The surveillance information generation apparatus 2000 of Example Embodiment 2 is realized using the computer 1000 in the same way as in Example Embodiment 1 (see FIG. 4). In the present example embodiment, each program module stored in the storage 1080 described above further includes a program for realizing each function described in the present example embodiment.

Modification Example

Figure 35:
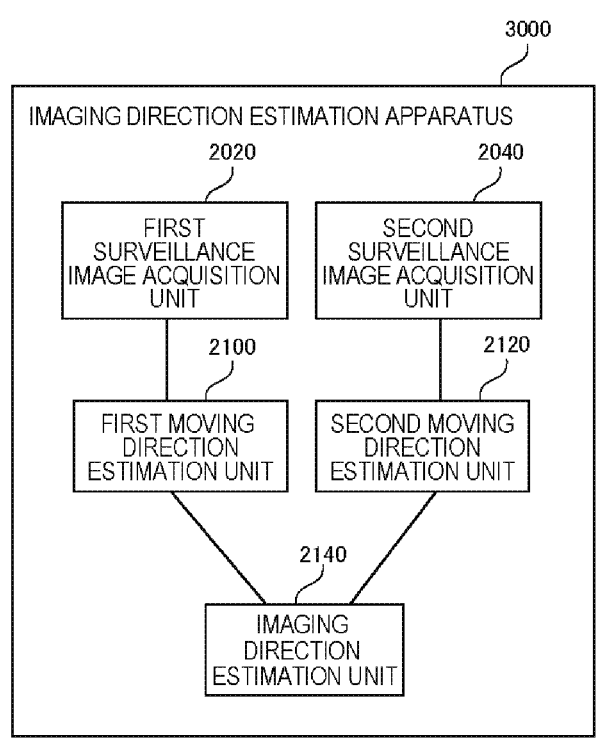
FIG. 35 is a block diagram illustrating an imaging direction estimation apparatus.

An apparatus for estimating the imaging direction of the moving camera 20 may be provided separately from the surveillance information generation apparatus 2000. This apparatus is referred to as an imaging direction estimation apparatus 3000. FIG. 35 is a block diagram illustrating the imaging direction estimation apparatus 3000. In FIG. 35, each block represents a functional unit configuration, instead of a hardware unit configuration.

The imaging direction estimation apparatus 3000 includes a first surveillance image acquisition unit 2020, a second surveillance image acquisition unit 2040, a first moving direction estimation unit 2100, a second moving direction estimation unit 2120, and an imaging direction estimation unit 2140. The function of each functional component is as described above.

The hardware configuration of the imaging direction estimation apparatus 3000 is illustrated, for example, in FIG. 4, similar to the surveillance information generation apparatus 2000. Note that, the storage of the computer that implements the imaging direction estimation apparatus 3000 stores program modules for realizing the functions of the respective functional components shown in FIG. 35.

Note that, in a case where an imaging direction estimation apparatus 3000 is provided independently from the surveillance information generation apparatus 2000, the generation unit 2060 of the surveillance information generation apparatus 2000 acquires the imaging direction of the moving camera 20 from the imaging direction estimation apparatus 3000 and uses it.

Although the example embodiments of the present invention have been described above with reference to the drawings, these are examples of the present invention, and it is possible to use various configurations other than the above exemplary embodiments.

Examples of a reference aspect will be added below.

1. A surveillance information generation apparatus comprising:

a first acquisition unit acquiring a first surveillance image imaged by a fixed camera, which is a camera a position of which is fixed;

a second acquisition unit acquiring a second surveillance image imaged by a moving camera, which is a camera a position of which is not fixed; and a generation unit generating surveillance information of an object by using the first surveillance image and the second surveillance image.

2. The surveillance information generation apparatus according to 1., wherein the generation unit generates a display in which the second surveillance image is superimposed on the first surveillance image, as the surveillance information.

3. The surveillance information generation apparatus according to 2., wherein the generation unit superimposes the second surveillance image on a position on the first surveillance image corresponding to a position of the moving camera in a real world.

4. The surveillance information generation apparatus according to 2. or 3., wherein the generation unit performs:

displaying a mark representing the moving camera on the first surveillance image; and in a case where an operation to select the mark is performed, as the surveillance information, generating a display in which the second surveillance image generated by the moving camera corresponding to the mark is superimposed on the first surveillance image.

5. The surveillance information generation apparatus according to 1., wherein the generation unit performs:

generating distribution information indicating distribution of an object captured in the first surveillance image;

calculating the number of objects captured in the second surveillance image; and correcting the distribution information by using the number of objects captured in the second surveillance image, and generating the corrected distribution information as the surveillance information.

6. The surveillance information generation apparatus according to 5., wherein the generation unit generates a display in which the corrected distribution information is superimposed on the first surveillance image.

7. The surveillance information generation apparatus according to 5., further comprising a map information acquisition unit acquiring map information of a place to be surveilled, wherein the generation unit generates a display in which the corrected distribution information is superimposed on a map indicated by the map information.

8. The surveillance information generation apparatus according to one of 5. to 7., wherein the generation unit performs:

calculating an imaging range of the moving camera in the first surveillance image, with using an imaging direction of the moving camera; and correcting the number or distribution of objects within the imaging range of the moving camera indicated by the distribution information, with using the number of objects captured in the second surveillance image.

9. The surveillance information generation apparatus according to any one of 1. to 8., wherein the generation unit superimposes a display representing an imaging direction of the moving camera on the first surveillance image.

10. The surveillance information generation apparatus according to 8. or 9., further comprising:

a first moving direction estimation unit estimating a first moving direction, which is a moving direction of the object in the first surveillance image;

a second moving direction estimation unit estimating a second moving direction, which is a moving direction of the object in the second surveillance image; and an imaging direction estimation unit estimating the imaging direction of the moving camera, based on the first moving direction, the second moving direction, a position and a pose of the fixed camera, and a position of the moving camera, wherein the generation unit uses the estimated imaging direction of the moving camera as the imaging direction of the moving camera.

11. The surveillance information generation apparatus according to 10., wherein the imaging direction estimation unit performs:

calculating a third moving direction which is the moving direction of the object captured in the second surveillance image, on a plane of a plan view of a place to be surveilled in a vertical direction, with using the position and pose of the fixed camera and the first moving direction;

calculating a plurality of candidate moving directions, which are moving directions of the object moving in the third moving direction that are assumed to be observed when viewing each of the plurality of candidate imaging directions from the position of the moving camera; and estimating that the candidate moving direction with a highest degree of equivalence to the second moving direction is the imaging direction of the moving camera.

12. The surveillance information generation apparatus according to 11., wherein the imaging direction estimation unit calculates the moving direction of the object captured in the first surveillance image on the plane, using the position and pose of the fixed camera and the first moving direction, and handles the calculated moving direction as the third moving direction.

13. The surveillance information generation apparatus according to 11., further comprising a moving route information acquisition unit acquiring moving route information indicating a moving route of an object, wherein the imaging direction estimation unit calculates the moving direction of the object captured in the first surveillance image on the plane, with using the position and pose of the fixed camera and the first moving direction, and wherein a moving direction that is obtained by moving the calculated moving direction to the vicinity of the moving camera along the moving route indicated by the moving route information is handled as the third moving direction.

14. An imaging direction estimation apparatus comprising:

a first moving direction estimation unit estimating a first moving direction, which is a moving direction of an object in a first surveillance image imaged by a fixed camera which is a camera whose position is fixed;

a second moving direction estimation unit estimating a second moving direction, which is a moving direction of an object in a second surveillance image imaged by a moving camera which is a camera whose position is not fixed; and an imaging direction estimation unit estimating the imaging direction of the moving camera, based on the first moving direction, the second moving direction, a position and a pose of the fixed camera, and a position of the moving camera.

15. The imaging direction estimation apparatus according to 14., wherein the imaging direction estimation unit performs:

calculating a third moving direction which is the moving direction of the object captured in the second surveillance image, on a plane of a plan view of a place to be surveilled in a vertical direction, with using the position and pose of the fixed camera and the first moving direction;

calculating a plurality of candidate moving directions which are moving directions of the object when viewing the object moving from each of the plurality of candidate imaging directions to the third moving direction at the position of the moving camera; and estimating that the candidate moving direction with a highest degree of equivalence to the second moving direction is the imaging direction of the moving camera.

16. The imaging direction estimation apparatus according to 15., wherein the imaging direction estimation unit calculates the moving direction of the object captured in the first surveillance image on the plane, using the position and pose of the fixed camera and the first moving direction, and handles the calculated moving direction as the third moving direction.

17. The imaging direction estimation apparatus according to 15., further comprising a moving route information acquisition unit acquiring moving route information indicating a moving route of an object, wherein the imaging direction estimation unit calculates the moving direction of the object captured in the first surveillance image on the plane, using the position and pose of the fixed camera and the first moving direction, and wherein a moving direction that is obtained by moving the calculated moving direction to the vicinity of the moving camera along the moving route indicated by the moving route information is handled as the third moving direction.

18. A surveillance information generation method executed by a computer, the method comprising:

a first acquisition step of acquiring a first surveillance image imaged by a fixed camera, which is a camera a position of which is fixed;

a second acquisition step of acquiring a second surveillance image imaged by a moving camera, which is a camera a position of which is not fixed; and a generation step of generating surveillance information of an object by using the first surveillance image and the second surveillance image.

19. The surveillance information generation method according to 18., wherein in the generation step, a display in which the second surveillance image is superimposed on the first surveillance image is generated as the surveillance information 20. The surveillance information generation method according to 19., wherein in the generation step, the second surveillance image is superimposed on a position on the first surveillance image corresponding to a position of the moving camera in a real world.

21. The surveillance information generation method according to 19. or 20., wherein in the generation step, displaying a mark representing the moving camera on the first surveillance image, and in a case where an operation to select the mark is performed, as the surveillance information, generating a display in which the second surveillance image generated by the moving camera corresponding to the mark is superimposed on the first surveillance image.

22. The surveillance information generation method according to 18., wherein in the generation step, generating distribution information indicating distribution of an object captured in the first surveillance image, calculating the number of objects captured in the second surveillance image, and correcting the distribution information by using the number of objects captured in the second surveillance image, and generating the corrected distribution information as the surveillance information.

23. The surveillance information generation method according to 22., wherein in the generation step, generating a display in which the corrected distribution information is superimposed on the first surveillance image.

24. The surveillance information generation method according to 22., further comprising a map information acquisition step of acquiring map information of a place to be surveilled, wherein in the generation step, generating a display in which the corrected distribution information is superimposed on a map indicated by the map information.

25. The surveillance information generation method according to any one of 22. to 24., wherein in the generation step, calculating an imaging range of the moving camera in the first surveillance image, using an imaging direction of the moving camera, and correcting the number or distribution of objects within the imaging range of the moving camera indicated by the distribution information, with using the number of objects captured in the second surveillance image.

26. The surveillance information generation method according to any one of 18. to 25., wherein in the generation step, superimposing a display representing an imaging direction of the moving camera on the first surveillance image.

27. The surveillance information generation method according to 25. or 26., further comprising:

a first moving direction estimation step of estimating a first moving direction, which is a moving direction of the object in the first surveillance image;

a second moving direction estimation step of estimating a second moving direction, which is a moving direction of the object in the second surveillance image; and an imaging direction estimation step of estimating the imaging direction of the moving camera, based on the first moving direction, the second moving direction, a position and a pose of the fixed camera, and a position of the moving camera, wherein in the generation step, the estimated imaging direction of the moving camera is used as the imaging direction of the moving camera.

28. The surveillance information generation method according to 27., wherein in the imaging direction estimation step, calculating a third moving direction which is the moving direction of the object captured in the second surveillance image, on a plane of plan view of a place to be surveilled in a vertical direction, with using the position and pose of the fixed camera and the first moving direction, calculating a plurality of candidate moving directions which are moving directions of the object moving in the third direction that are assumed to be observed when viewing each of the plurality of candidate imaging directions from the position of the moving camera, and estimating the candidate moving direction with a highest degree of equivalence to the second moving direction is estimated as the imaging direction of the moving camera.

29. The surveillance information generation method according to 28., wherein calculating in the imaging direction estimation step, the moving direction of the object captured in the first surveillance image on the plane, with using the position and pose of the fixed camera and the first moving direction, and handling the calculated moving direction as the third moving direction.

30. The surveillance information generation method according to 28., further comprising:

moving route information acquisition step of acquiring moving route information indicating a moving route of an object, wherein in the imaging direction estimation step, calculating the moving direction of the object captured in the first surveillance image on the plane with using the position and pose of the fixed camera and the first moving direction, and wherein a moving direction that is obtained by moving the calculated moving direction to the vicinity of the moving camera along the moving route indicated by the moving route information is handled as the third moving direction.

31. An imaging direction estimation method executed by a computer, the method comprising:

a first moving direction estimation step of estimating a first moving direction which is a moving direction of an object in a first surveillance image imaged by a fixed camera, which is a camera a position of which is fixed;

a second moving direction estimation step of estimating a second moving direction which is a moving direction of an object in a second surveillance image imaged by a moving camera, which is a camera a position of which is not fixed; and an imaging direction estimation step of estimating the imaging direction of the moving camera, based on the first moving direction, the second moving direction, a position and a pose of the fixed camera, and a position of the moving camera.

32. The imaging direction estimation method according to 31., wherein in the imaging direction estimation step, calculating a third moving direction which is the moving direction of the object captured in the second surveillance image, on a plane of a plan view of a place to be surveilled in a vertical direction, with using the position and the pose of the fixed camera and the first moving direction, calculating a plurality of candidate moving directions which are moving directions of the object moving in the third moving direction that are assumed to be observed when viewing each of the plurality of candidate imaging directions from the position of the moving camera, and estimating the candidate moving direction with a highest degree of equivalence to the second moving direction as the imaging direction of the moving camera.

33. The imaging direction estimation method according to 32., wherein in the imaging direction estimation step, calculating the moving direction of the object captured in the first surveillance image on the plane, with using the position and the pose of the fixed camera and the first moving direction, and handling the calculated moving direction as the third moving direction.

34. The imaging direction estimation method according to 32., further comprising moving route information acquisition step of acquiring moving route information indicating a moving route of an object, wherein in the imaging direction estimation step, calculating the moving direction of the object captured in the first surveillance image on the plane with using the position and pose of the fixed camera and the first moving direction, and wherein a moving direction that is obtained by moving the calculated moving direction to the vicinity of the moving camera along the moving route indicated by the moving route information is handled as the third moving direction.

35. A program that causes a computer to execute each step according to any one of 18. to 34.

The invention claimed is:
1. An imaging direction estimation apparatus comprising:
at least one processor configured to:
estimate a first moving direction of an object in a first surveillance image from a fixed camera which is a camera whose position is fixed;

estimate a second moving direction of an object in a second surveillance image from a moving camera which is a camera whose position is not fixed; and estimate an imaging direction of the moving camera, based on the first moving direction of the object in the first surveillance image, the second moving direction of the object in the second surveillance image, a position and a pose of the fixed camera, and a position of the moving camera.

2. An imaging direction estimation method executed by a computer, the method comprising:

estimating a first moving direction of an object in a first surveillance image from a fixed camera at a fixed position;

estimating a second moving direction of an object in a second surveillance image from a moving camera which does not have a fixed position; and estimating an imaging direction of the moving camera, based on the first moving direction of the object in the first surveillance image, the second moving direction of the object in the second surveillance image, a position and pose of the fixed camera, and a position of the moving camera.

3. A surveillance information generation apparatus comprising:

at least one processor configured to:

acquire a first surveillance image from a fixed camera at a fixed position;

acquire a second surveillance image from a moving camera, which does not have a fixed position;

generate surveillance information of an object by using the first surveillance image and the second surveillance image;

generate distribution information indicating distribution of an object captured in the first surveillance image;

calculate a number of objects captured in the second surveillance image;

correct the distribution information by using the number of the objects captured in the second surveillance image; and generate the corrected distribution information as the surveillance information, wherein the at least one processor is further configured to:
calculate an imaging range of the moving camera in the first surveillance image using an imaging direction of the moving camera; and correcting the number or distribution of the objects within the imaging range of the moving camera indicated by the distribution information using the number of the objects captured in the second surveillance image.

4. The surveillance information generation apparatus according to claim 3, wherein the at least one processor is further configured to generate a display in which the corrected distribution information is superimposed on the first surveillance image.

5. The surveillance information generation apparatus according to claim 3, wherein the at least one processor is further configured to:

acquire map information of a location to be surveilled; and generate a display in which the corrected distribution information is superimposed on a map indicated by the map information.

6. The surveillance information generation apparatus according to claim 3, wherein the at least one processor is further configured to:

estimate a first moving direction of the object in the first surveillance image;

estimate a second moving direction of the object in the second surveillance image; and estimate the imaging direction of the moving camera, based on the first moving direction, the second moving direction, a position and a pose of the fixed camera, and a position of the moving camera, use the estimated imaging direction of the moving camera as the imaging direction of the moving camera.

7. The surveillance information generation apparatus according to claim 6, wherein the at least one processor is further configured to:

calculate a third moving direction of the object captured in the second surveillance image on a plane of a plan view of a location to be surveilled in a vertical direction using the position and pose of the fixed camera and the first moving direction;

calculate a plurality of candidate moving directions of the object when viewing the object moving from each of the plurality of candidate imaging directions to the third moving direction at the position of the moving camera; and estimate the candidate moving direction with a highest degree of equivalence to the second moving direction as the imaging direction of the moving camera.

8. The surveillance information generation apparatus according to claim 7, wherein the at least one processor is further configured to calculate the moving direction of the object captured in the first surveillance image on the plane using the position and pose of the fixed camera and the first moving direction, and handles the calculated moving direction as the third moving direction.

9. The surveillance information generation apparatus according to claim 7, wherein the at least one processor is further configured to:

acquire moving route information indicating a moving route of the object, calculate the moving direction of the object captured in the first surveillance image on the plane using the position and pose of the fixed camera and the first moving direction, and wherein a moving direction that is obtained by moving the calculated moving direction to the vicinity of the moving camera along the moving route indicated by the moving route information is handled as the third moving direction.

10. A surveillance information generation method executed by a computer, the method comprising:

acquiring a first surveillance image from a fixed camera at a fixed position;

acquiring a second surveillance image from a moving camera, which does not have a fixed position;

generating surveillance information of an object by using the first surveillance image and the second surveillance image;

generating distribution information indicating distribution of an object captured in the first surveillance image;

calculating a number of objects captured in the second surveillance image;

correcting the distribution information by using the number of the objects captured in the second surveillance image; calculating an imaging range of the moving camera in the first surveillance image using an imaging direction of the moving camera;

correcting the number or distribution of the objects within the imaging range of the moving camera indicated by the distribution information using the number of the objects captured in the second surveillance image; and generating the corrected distribution information as the surveillance information.

11. A non-transitory computer-readable storage medium storing a program that causes a computer to execute:

acquiring a first surveillance image from a fixed camera at a fixed position;

acquiring a second surveillance image from a moving camera, which does not have a fixed position;

generating surveillance information of an object by using the first surveillance image and the second surveillance image;

generating distribution information indicating distribution of an object captured in the first surveillance image;

calculating a number of objects captured in the second surveillance image;

correcting the distribution information by using the number of the objects captured in the second surveillance image;

calculating an imaging range of the moving camera in the first surveillance image using an imaging direction of the moving camera;

correcting the number or distribution of the objects within the imaging range of the moving camera indicated by the distribution information using the number of the objects captured in the second surveillance image; and generating the corrected distribution information as the surveillance information.

12. A non-transitory computer-readable storage medium storing a program that causes a computer to execute:

estimating a first moving direction of an object in a first surveillance image from a fixed camera at a fixed position;

estimating a second moving direction of an object in a second surveillance image from a moving camera which does not have a fixed position; and estimating an imaging direction of the moving camera, based on the first moving direction of the object in the first surveillance image, the second moving direction of the object in the second surveillance image, a position and pose of the fixed camera, and a position of the moving camera.

* * * * *